US010159003B2

United States Patent
Ho et al.

(10) Patent No.: US 10,159,003 B2
(45) Date of Patent: Dec. 18, 2018

(54) NETWORK ENTRY METHOD OF MILLIMETER WAVE COMMUNICATION SYSTEM AND RELATED APPARATUESES USING THE SAME

(71) Applicant: Industrial Technology Research Institute, Hsinchu (TW)

(72) Inventors: Chung-Lien Ho, Taoyuan (TW); Ren-Jr Chen, Hsinchu (TW); Wen-Chiang Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 48 days.

(21) Appl. No.: 15/367,202

(22) Filed: Dec. 2, 2016

(65) Prior Publication Data

US 2017/0164211 A1    Jun. 8, 2017

Related U.S. Application Data

(60) Provisional application No. 62/262,927, filed on Dec. 4, 2015, provisional application No. 62/262,926, filed on Dec. 4, 2015.

(51) Int. Cl.
*H04W 16/28* (2009.01)
*H04W 48/16* (2009.01)
(Continued)

(52) U.S. Cl.
CPC .......... *H04W 16/28* (2013.01); *H04B 7/0695* (2013.01); *H04B 7/088* (2013.01);
(Continued)

(58) Field of Classification Search
None
See application file for complete search history.

(56) References Cited

U.S. PATENT DOCUMENTS 7,773,988 B2    8/2010  Jung et al.
8,594,053 B2    11/2013 Kim et al.
(Continued)

FOREIGN PATENT DOCUMENTS

CN    103620976    3/2014
CN    105723642    6/2016
(Continued)

OTHER PUBLICATIONS

Zhouyue Pi et al., "An introduction to millimeter-wave mobile broadband systems", IEEE Communications Magazine, vol. 49, No. 6, Jun. 2011, 101-107.
(Continued)

*Primary Examiner* — Noel R Beharry
*Assistant Examiner* — Ruihua Zhang
(74) *Attorney, Agent, or Firm* — JCIPRNET

(57) ABSTRACT

According to one of the exemplary embodiments, the proposed network entry method is applicable to a user equipment and includes: receiving, within an mmWave band, Q scan beams which have Q IDs over M mmWave time units as each mmWave time unit includes a payload region and a BF header region that includes N BSSs with each of the BSSs corresponding to a different one of the Q scan beams, wherein M, N, and Q are integers greater than 1 and M*N=Q; determining a best beam of the UE based on the BSSs of the Q scan beams; determining a best scan beam of the Q scan beams based on the BSSs of the Q scan beams after determining the best beam of the UE; and transmitting, within the mmWave band, a random access preamble (RAP) by using the best beam of the UE.

26 Claims, 24 Drawing Sheets

(51) Int. Cl.

| | | |
|---|---|---|
| *H04W 74/08* | (2009.01) | |
| *H04L 5/00* | (2006.01) | |
| *H04W 36/00* | (2009.01) | |
| *H04W 72/04* | (2009.01) | |
| *H04W 72/08* | (2009.01) | |
| *H04B 7/06* | (2006.01) | |
| *H04B 7/08* | (2006.01) | |
| *H04W 88/02* | (2009.01) | |
| *H04W 88/08* | (2009.01) | |
| *H04L 27/26* | (2006.01) | |

(52) U.S. Cl.
CPC ............ *H04L 5/005* (2013.01); *H04L 5/0023* (2013.01); *H04L 5/0044* (2013.01); *H04L 5/0048* (2013.01); *H04L 5/0051* (2013.01); *H04W 36/0088* (2013.01); *H04W 48/16* (2013.01); *H04W 72/046* (2013.01); *H04W 72/0413* (2013.01); *H04W 72/085* (2013.01); *H04W 74/0833* (2013.01); *H04L 27/2602* (2013.01); *H04W 88/02* (2013.01); *H04W 88/08* (2013.01)

(56) References Cited

U.S. PATENT DOCUMENTS

| | | | |
|---|---|---|---|
| 9,380,582 B2 | 6/2016 | Li et al. | |
| 2005/0101264 A1* | 5/2005 | Farlow | H04B 7/0691 |
| | | | 455/84 |
| 2011/0159867 A1 | 6/2011 | Kuo | |
| 2012/0307726 A1 | 12/2012 | Pi et al. | |
| 2012/0320874 A1 | 12/2012 | Li et al. | |
| 2013/0064239 A1 | 3/2013 | Yu et al. | |
| 2013/0272220 A1* | 10/2013 | Li | H04W 72/046 |
| | | | 370/329 |
| 2013/0286960 A1 | 10/2013 | Li et al. | |
| 2014/0172435 A1* | 6/2014 | Thiergart | G01S 3/80 |
| | | | 704/500 |
| 2014/0177607 A1* | 6/2014 | Li | H04W 74/0833 |
| | | | 370/336 |
| 2016/0197659 A1* | 7/2016 | Yu | H04W 16/28 |
| | | | 370/335 |
| 2018/0019901 A1* | 1/2018 | Choi | H04L 27/26 |

FOREIGN PATENT DOCUMENTS

| | | |
|---|---|---|
| WO | 2015020404 | 2/2015 |
| WO | 2015147717 | 10/2015 |

OTHER PUBLICATIONS

Wonil Roh et al., "Millimeter-wave beamforming as an enabling technology for 5G cellular communications: Theoretical feasibility and prototype results", IEEE Communications Magazine, vol. 52, No. 2, Feb. 2014, 106-113.

Sridhar Rajagopal et al., "Antenna array design for multi-Gbps mmWave mobile broadband communication", IEEE Globecom 2011, Dec. 5-9, 2011, 1-6.

Bei Yin† et al., "High-throughput beamforming receiver for millimeter wave mobile communication", IEEE Globecom 2013, Dec. 9-13, 2013, 3697-3702.

Farooq Khan et al., "Millimeter-wave mobile broadband with large scale spatial processing for 5G mobile communication", IEEE Fiftieth Annual Allerton Conference, Oct. 1, 2012, 1517-1523.

Taeyoung Kim et al., "Tens of Gbps support with mmWave beamforming systems for next generation commmunications", IEEE Globecom 2013, 2013, 3685-3690.

"Office Action of Taiwan Counterpart Application", dated Mar. 28, 2018, p. 1-p. 10.

C. Jeong, J. Park and H. Yu, "Random access in millimeter-wave beamforming cellular networks: issues and approaches", IEEE Communications Magazine, Jan. 2015, pp. 180-185.

"Office Action of Taiwan Counterpart Application," dated Aug. 23, 2018, pp. 1-9.

* cited by examiner

| Uplink-downlink configuration index | Downlink-to-Uplink Switch-point periodicity | Subframe number | | | | | | | | | |
|---|---|---|---|---|---|---|---|---|---|---|---|
| | | BF header | | | PL region | | | | | | |
| | | 0 | 1 | 2 | 3 | 4 | 5 | 6 | 7 | 8 | 9 |
| 0 | 2 ms | D | S | U | D | D | D | D | D | S | U |
| 1 | 2 ms | D | S | U | D | D | D | D | S | U | U |
| 2 | 2 ms | D | S | U | D | D | D | S | U | U | U |

FIG. 13

NETWORK ENTRY METHOD OF MILLIMETER WAVE COMMUNICATION SYSTEM AND RELATED APPARATUESES USING THE SAME

CROSS REFERENCE TO RELATED APPLICATION

This application claims the priority benefit of U.S. provisional application Ser. No. 62/262,926 filed on Dec. 4, 2015, and U.S. provisional application Ser. No. 62/262,927 filed on Dec. 4, 2015. The entirety of each of the above-mentioned patent applications is hereby incorporated by reference herein and made a part of specification.

TECHNICAL FIELD

The disclosure is directed to a network entry method of a millimeter wave communication system and related apparatuses using the same method.

BACKGROUND

The antenna array aperture for mmWave is first introduced. It has been known that propagation of an electromagnetic wave is typically poorer at higher frequencies than lower frequencies. For example, the attenuation of electromagnetic waves around the millimeter wave (mmWave) frequency range would typically be higher than the attenuation around the micro wave frequency range as the path loss is usually more severe at higher frequencies. FIG. 1 illustrates such scenario with a transmitter (Tx) transmitting electromagnetic wave toward a receiver (Rx), and the mmWave aperture 101 is smaller than microwave aperture 102 since the mmWave has smaller wavelength. For an omni-directional antenna at both the transmitter and receiver, the received power ($P_r$) could be expressed as $$P_r = A_{eff} \frac{P_t}{4\pi d^2} = \left(\frac{\lambda}{4\pi d}\right)^2 P_t, \text{ in which } A_{eff} = \frac{\lambda^2}{4\pi} \quad \text{Equation (1)}$$

$A_{eff}$ is the antenna effective aperture with $\lambda$ being the wavelength, $P_t$ is the transmit power and d the distance between the transmit antenna and receive antenna. The frequency of an electromagnetic wave has an inverse relationship from the wavelength of the electromagnetic wave, and the wavelength of the electromagnet wave is proportional to the size of the antenna. For example, if the propagating frequency is 30 GHz, then the wavelength is 10 mm; if the propagating frequency is 60 GHz, then the wavelength is 5 mm; and so forth.

Referring to FIG. 1, it can derived from Equation (1) that a system driving at a higher frequency would lead to a smaller antenna aperture and thus a lower received power. For example, an additional 20 dB extra loss could be incurred by the mmWave system as the propagating is increased from 3 GHz to 30 GHz. In such case, large arrays could be required in order to increase the aperture to compensate the path loss. On the other hand, additional losses such as the foliage loss which limits the coverage in forests and the heavy rains resulting in several dB losses in a 100 meter link may require larger margin in link budgets according to the high frequency operation.

Also due to higher propagating frequency, mmWave signals could be more sensitive to the blockages by some materials, such as metals or brick walls, in comparison to microwave signals. This would result in isolations of an indoor network from an outdoor network in the mmWave. Such phenomenon could be explained by comparing a line of sight (LOS) environment and a non-line-of-sight (NLOS) environment. FIG. 2 illustrates a LOS environment relative to a NLOS environment. Specifically, signals propagating in a LOS environment would be more like propagating in free space which exhibits a path loss exponent (PLE) in the range of 2~3. However, signals propagating in the NOS environment would be much weaker, more sensitive to the environment, and exhibits the PLE in the range of 3~4. For an accurate analysis without a loss of generality, incorporating the blockage effects in channel modeling could be needed.

In order to achieve a higher data rate, a larger bandwidth may be considered especially in mmWave wireless broadband systems. In such a system, the communication link with a larger bandwidth may lead to a higher noise power and thus a lower signal-to-noise ratio (SNR). FIG. 3 illustrates noise bandwidth in mmWave relative to noise bandwidth in microwave. As shown in FIG. 3, the mmWave noise bandwidth 301 would be greater than the microwave noise bandwidth 302. An extra noise power of 10 dB could be present from 50 MHz to 500 MHz. Therefore, a larger gain could be required in the mmWave communication system in order to compensate the power loss by using larger antenna arrays.

As for the beamforming operation for the mmWave communication system, there could be multiple beamforming schemes which includes digital baseband beamforming as shown in FIG. 4(a), analog baseband beamforming a shown in FIG. 4(b), and analog radio frequency (RF) beamforming as shown in FIG. 4(c). For power consumption and cost issues, the transmitter or the receiver may limit the number of RF chains. Thus, the analog RF beamforming as shown in FIG. 4(c) might be a good candidate in mmWave communications.

FIG. 5 illustrates examples of radiation patterns of different transmission wavelengths. In general, a communication system operating in the microwave band which has wavelengths in the centimeter range tends to have a small number of antennas. The radiation pattern of a single microwave frequency antenna 501 tending to be long distance, has a broad field-of-view (FoV) coverage, and is typical for a 3G/4G communication systems that use the micro-wave band with small number of BS antennas to achieve a higher receive SNR quality. However, low data rate due to small BS exists in such the systems. To increase the data rate by using a large BW, mmWave band is considered in the future communication system (e.g. 5G systems). The radiation pattern of a single mmWave single frequency antenna 502 covers a shorter distance; however, the mmWave radiation pattern 503 could be extended by using an mmWave antenna array for beamforming under the same transmitted power. Each of the BS beams 504 may have a different beam ID. In general, an mmWave communication system that uses a small sized antenna array tends to have a shorter distance and a broad coverage; whereas an mmWave communication system that uses a larger sized antenna array tend to have a longer distance and a narrower coverage.

The transmission framework of mmWave wireless communication systems could be classified into two categories based on the radio access interface. A first category is multiple radio access technology (multi-RAT) and a second category is single radio access technology (Single-RAT). FIG. 6 illustrates an example of a 5G multi-RAT communication system of the first category and the second category.

The multi-RAT system has at least two RATs such as a LTE system and an mmWave system which have been phrased as the LTE+mmWave integrated system which would co-exist simultaneously for communications. For example, control signaling could be transmitted by using the conventional LTE communication frequency whereas the user data could be transmitted by using mmWave communication frequency. In such case, the carrier aggregation (CA) scheme could be utilized. The user data could be transmitted over the mmWave band by using, for example, a secondary component carrier (SCC), but control signals could be transmitted over the microwave frequency by using a primary component carrier (PCC). Network entry could be performed via the cmWave by using a PCC since a successful detection rate for control signaling could be operated in large coverage, high mobility and low SNR scenarios. On the other hand, the single-RAT communication system of the second category would use only one radio access technology for communication applications by using the mmWave band to transmit both user data and control signals. Network entry would be performed via a carrier in the mmWave band. Thus, a successful detection rate for control signaling may need to be operated in small coverage, low mobility and high SNR scenarios. To remedy this problem, beamforming technique may be used.

FIG. 7 illustrates a typical network entry procedure of a legacy communication system (e.g. 4G LTE system). After a UE powers on 701, the UE would perform at least a time/frequency synchronization (P-SCH & S-SCH) procedure 702, a cell-ID detection (S-SCH&RS) procedure 703, a (PBCH-MIB) broadcast signal detection procedure 704, a (PDDCH/SI-RNTI-SIB1) broadcast signal detection procedure 705, and a (PDDCH/SI-RNTI-SIB2) broadcast signal detection procedure 706. Subsequently, in step 711, the UE would initiate the random access procedure by transmitting a Random Access Preamble (RAP) to the serving BS (BS). The RAP could be used by the BS to calculating the timing advance (TA) parameter which is subsequently transmitted to the UE in step 712. In step 712, the BS would respond to the UE by transmitting a Random Access Response (RAR) back to the UE. The RAR would include various parameters such as TA, uplink (UL) grant, and TC-RNTI. In step 713, the UE would initiate network contention by transmitting to the BS a message that includes at least the S-TMSI which could be a 40 bit signal. In step 714, the BS would inform the contention resolution to the UE by transmitting a message which includes at least the C-RNTI to the UE. The C-RNTI could then be used by the UE to decode its data packets.

It should be noted that, as shown in FIG. 7, there is no beam related processing. For example, in the legacy LTE system, the reference signal transmitted from the BS to the UE as well as the subsequent signaling exchanges (e.g. 711~714) would all use signals that are omni-directional. However, for communication systems that use beamforming for both control signaling and data packets by operating in the mmWave frequency, the current transmission scheme could be inadequate.

SUMMARY OF THE DISCLOSURE

The disclosure is directed to a network entry method of a millimeter wave communication system and related apparatuses using the same method.

According to one of the exemplary embodiments, the disclosure proposes a network entry method that is used by a BS of a millimeter wave (mmWave) communication system. The method would include not limited to: transmitting, within an mmWave band, Q scan beams which have Q identifiers (IDs) over M mmWave time units as each mmWave time unit comprises a payload region and a beamforming (BF) header region that comprises N beam search signals (BSSs) with each of the BSSs corresponding to a different one of the Q scan beams, wherein M, N, and Q are integers greater than 1 and M*N=Q; receiving, within the mmWave band, a random access preamble (RAP) in response to transmitting the plurality mmWave time units; determining, from the Q scan beams, one scan beam based on the RAP; transmitting a random access response (RAR) by using the one scan beam.

According to one of the exemplary embodiments, the disclosure proposes a network entry method that is used by a user equipment (UE) of a millimeter wave (mmWave) communication system. The method would include not limited to: receiving, within an mmWave band, Q scan beams which have Q identifiers (IDs) over M mmWave time units as each mmWave time unit comprises a payload region and a beamforming (BF) header region that comprises N beam search signals (BSSs) with each of the BSSs corresponding to a different one of the Q scan beams, wherein M, N, and Q are integers greater than 1 and M*N=Q; determining a best beam of the UE based on the BSSs of the Q scan beams; determining a best scan beam of the Q scan beams based on the BSSs of the Q scan beams after determining the best beam of the UE; and transmitting, within the mmWave band, a random access preamble (RAP) by using the best beam of the UE.

According to one of the exemplary embodiments, the disclosure proposes a BS which would include not limited to: a transmitter which operates in mmWave frequencies; a receiver which operates in mmWave frequencies; and a processor coupled to the transmitter and the receiver and is configured at least for: transmitting, within an mmWave band by using the transmitter, Q BS scan beams which have Q identifiers (IDs) over M mmWave time units as each mmWave time unit comprises a payload region and a beamforming (BF) header region that comprises N beam search signals (BSSs) with each of the BSSs corresponding to a different one of the Q BS scan beams, wherein M, N, and Q are integers greater than 1 and M*N=Q; receiving, within the mmWave band by using the receiver, a random access preamble (RAP) in response to transmitting the plurality mmWave time units; determining, from the Q BS scan beams, one BS scan beam based on the RAP; and transmitting, by using the transmitter, a random access response (RAR) by using the one BS scan beam.

According to one of the exemplary embodiments, the disclosure proposes a user equipment (UE) which would include not limited to: a transmitter which operates in mmWave frequencies; a receiver which operates in mmWave frequencies; and a processor coupled to the transmitter and the receiver and is configured at least for: receiving, within an mmWave band by using the receiver, Q scan beams which have Q identifiers (IDs) over M mmWave time units as each mmWave time unit comprises a payload region and a beamforming (BF) header region that comprises N beam search signals (BSSs) with each of the BSSs corresponding to a different one of the Q scan beams, wherein M, N, and Q are integers greater than 1 and M*N=Q; determining a best beam of the UE based on the BSSs of the Q scan beams; determining a best scan beam of the Q scan beams based on the BSSs of the Q scan beams after determining the best beam of the UE; and transmitting, within the mmWave band by using the transmitter, a random access preamble (RAP) by using the best beam of the UE.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 13 illustrates an example of a configurable frame structure for TDD in accordance with one of the exemplary embodiments of the disclosure.

DETAILED DESCRIPTION OF DISCLOSED EMBODIMENTS

Figure 1:
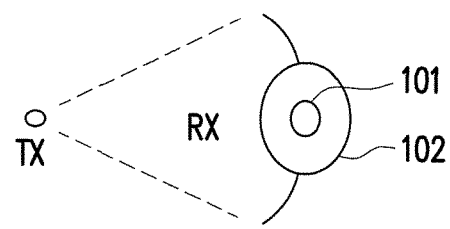
FIG. 1 illustrates an example of an mmWave aperture relative to a microwave aperture at a receiver.
Figure 2:
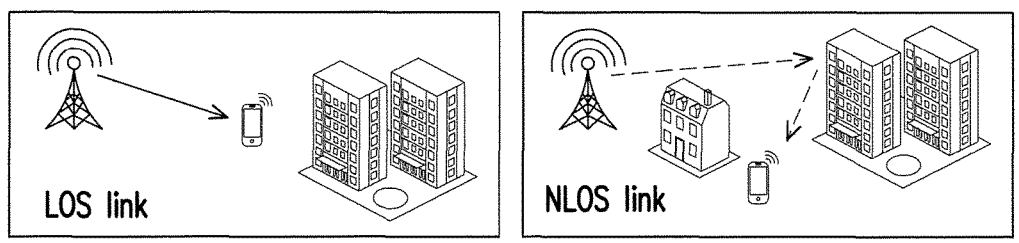
FIG. 2 illustrates a LOS environment relative to a NLOS environment.
Figure 3:
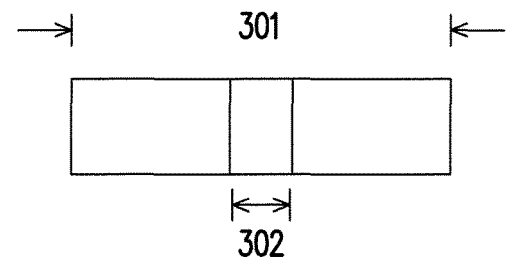
FIG. 3 illustrates noise bandwidth in mmWave band relative to noise bandwidth in microwave band.
Figure 4:
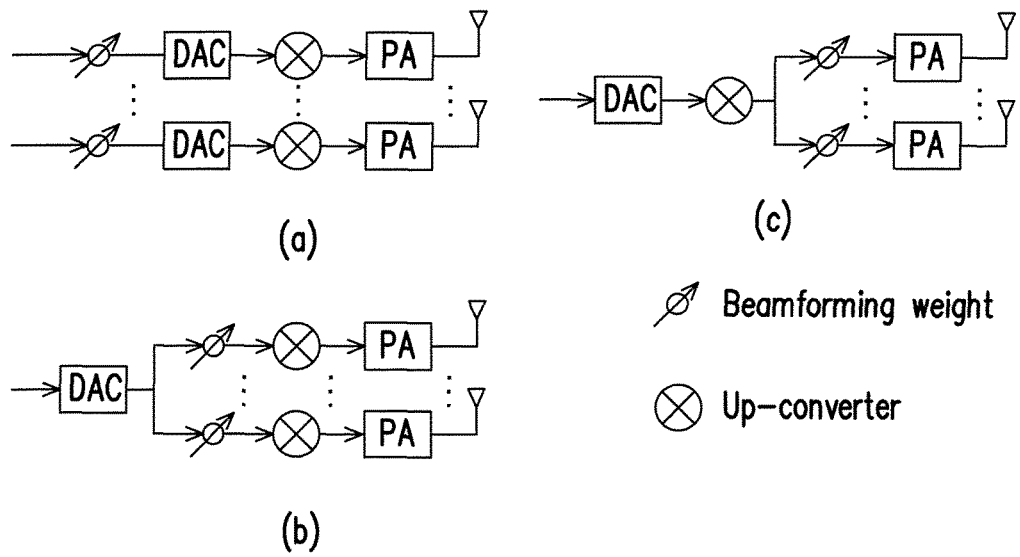
FIG. 4 illustrates various types of beamforming transmitters used in a wireless communication system.
Figure 5:
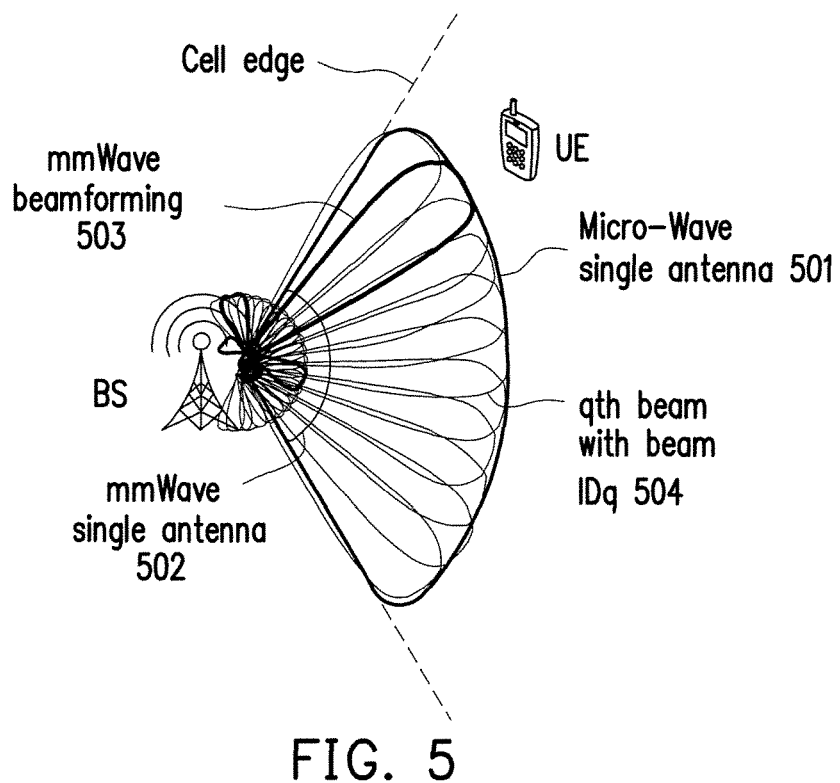
FIG. 5 illustrates examples of radiation patterns of different transmission wavelengths.
Figure 6:
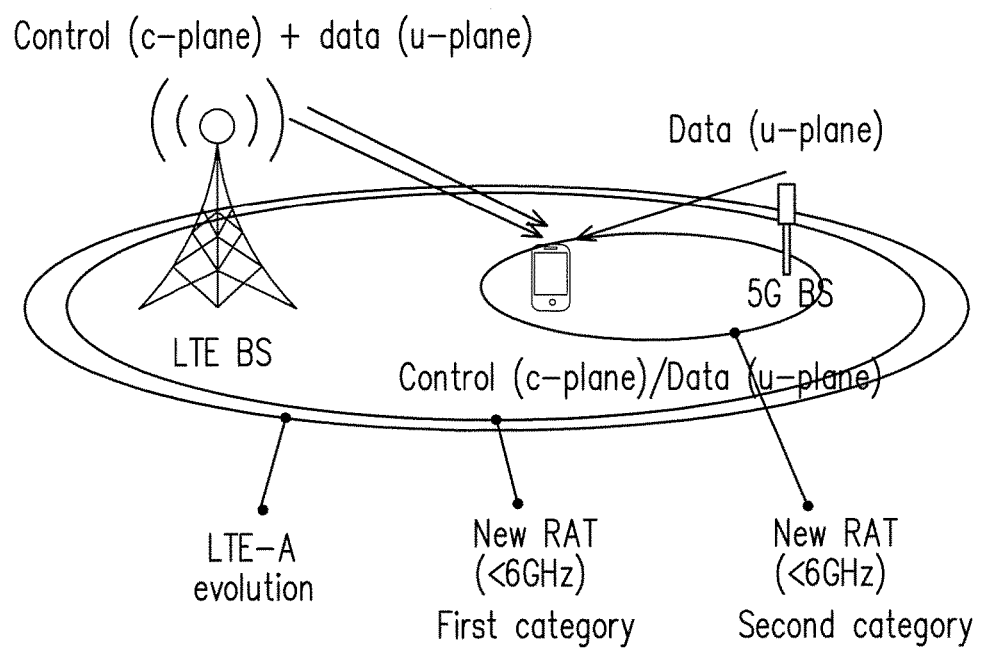
FIG. 6 illustrates an example of a multi-RAT communication system.
Figure 7:
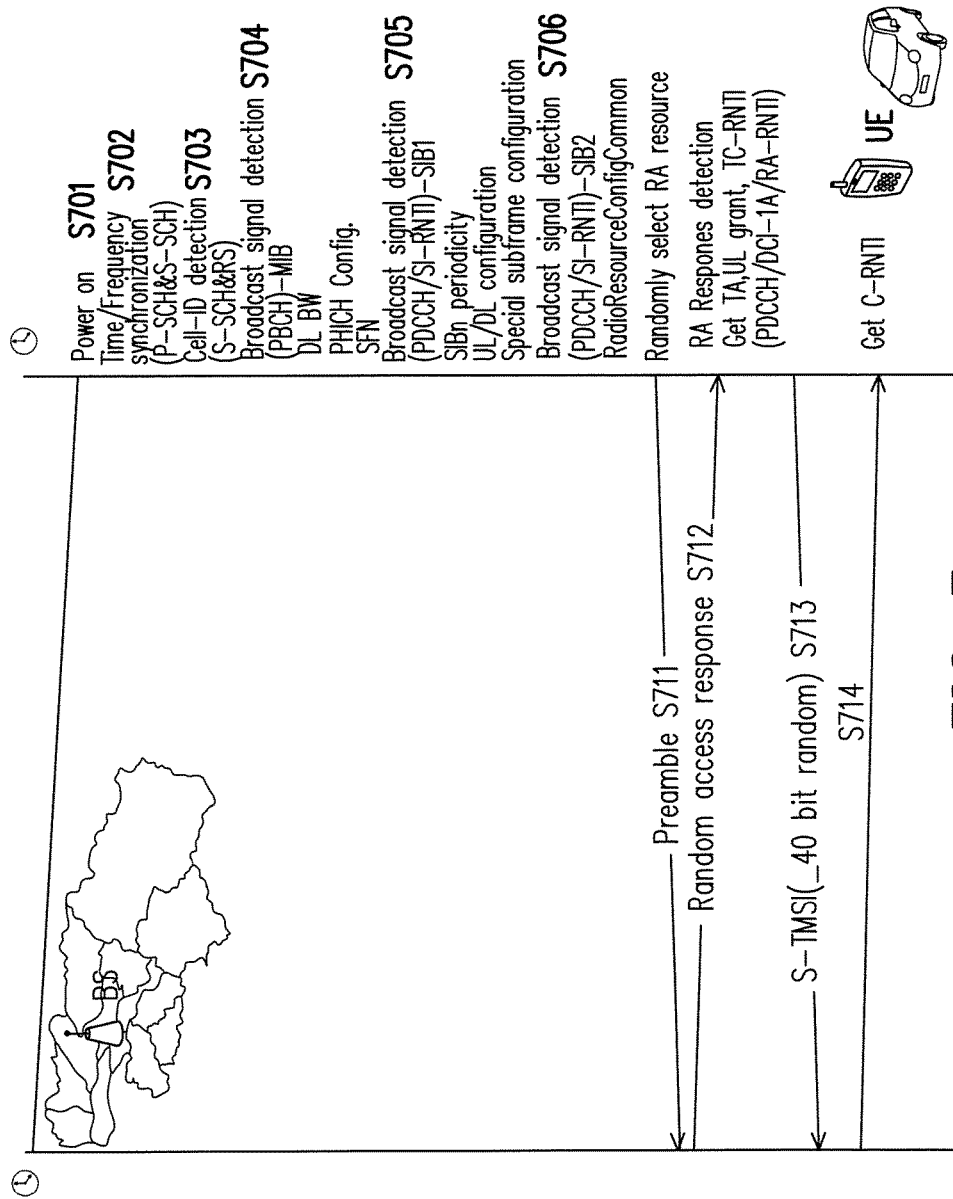
FIG. 7 illustrates a typical network entry procedure of a legacy communication system.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure is directed to a network entry method of a millimeter wave communication system and related apparatuses using the same method. The disclosure proposes a time division duplexing (TDD) mmWave frame structure which includes a beamforming (BF) header and a payload (PL) region that follows the BF header. The BF header would include not limited to a downlink (DL) region and an uplink (UL) region. The BF header would provide functions not limited to (BS/UE) beam acquisition, automatic gain control (AGC), timing/frequency synchronization, cell identification, system information (SI) configuration and time advance (TA) for random access (RA). During network entry, the UE beam acquisition could be performed based on autocorrelation of a beam search signal (BSS). Subsequently, timing could be detected, and AGC could be set after the best UE beam has been detected. Then, the AGC could be fixed, and the BS beam acquisition could be accomplished. The AGC could be then maintained and frequency offset could be detected while best BS beam detected. Next, cell identification could be performed, and SI could be obtained. Also the timing advance (TA) could be set for random access (RA).

Figure 8:
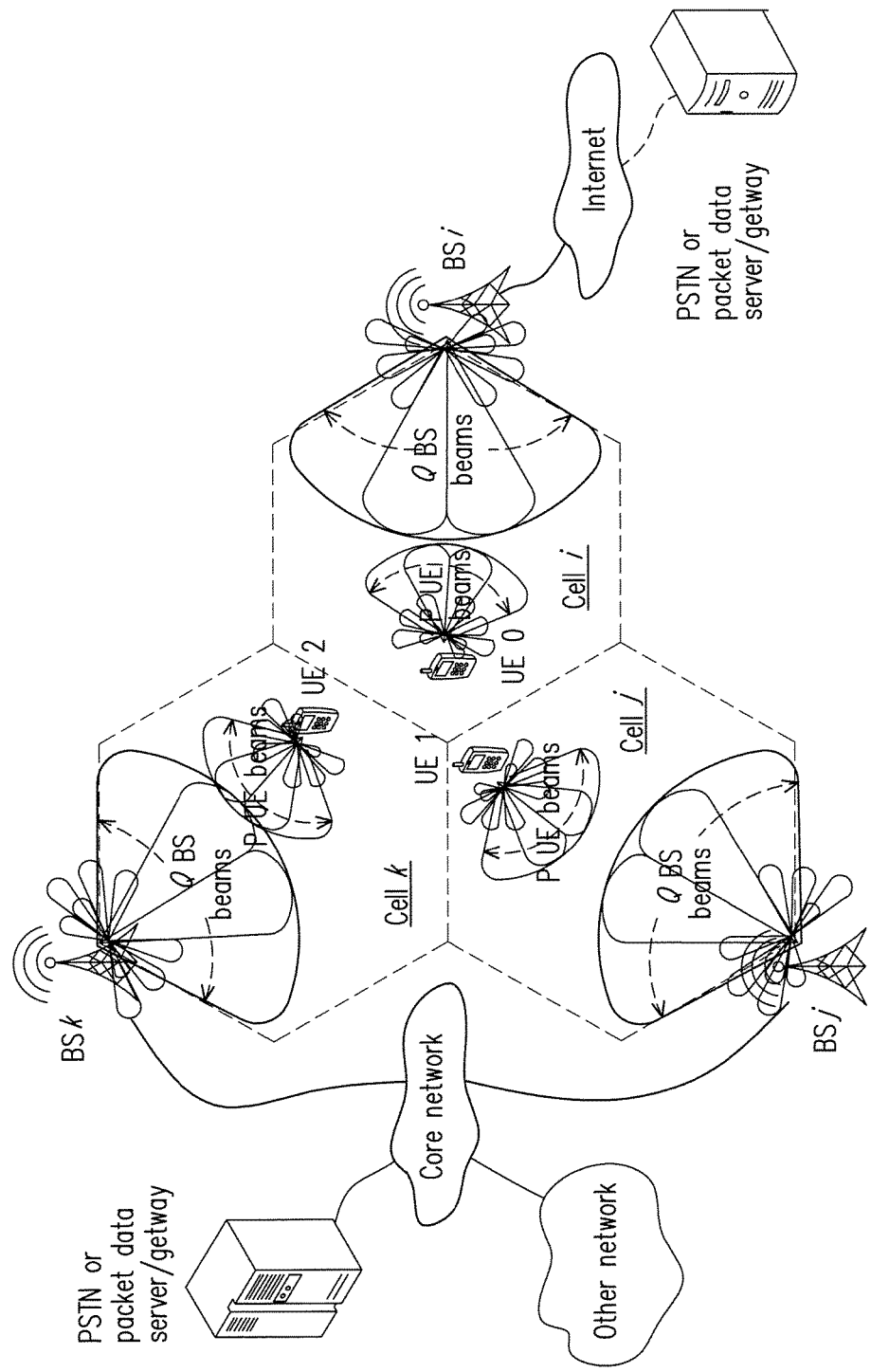
FIG. 8 illustrates an example of an mmWave communication system in accordance with one of the exemplary embodiments of the disclosure.

FIG. 8 illustrates an example of an mmWave communication system. Referring to FIG. 8, an mmWave wireless communication would include one or more cells (e.g. Cell i, Cell j, Cell k) with each of which under the coverage of a BS (e.g. BS i, BS j, BS k) and one or more mobile stations (MSs) (or user equipment (UEs)) with each of which served by at least one BS. It could be assumed that multiple antennas would be used by the BSs and UEs so that beamforming capability is available to both the BSs and UEs. For simplicity, it is assumed that Q beams are used by BSs, and P beams are used by the UEs. The data packets and various signals could thus be transmitted from and/or received by the BSs and/or UEs via the Q beams and P beams, respectively. The mmWave wireless communication system may also include a number of public switched telephone networks (PSTNs), packet data servers/gateways, and mobility management gateways (MMEs). The BSs may connect to at least one PSTN or a packet data server/gateway by using the X2 interface through one or more (core) networks or the internet. Upon receiving any one of the Q beams, the UE may determine the beam ID(s) which correspond to one of the Q beams received. The beam ID(s) embedded in beam search signal(s) (BSS(s)) could be transmitted via BS scan beam(s). It should be noted that the cells (e.g. Cell i, Cell j, Cell k) may use the same set of beam IDs.

Figure 9:
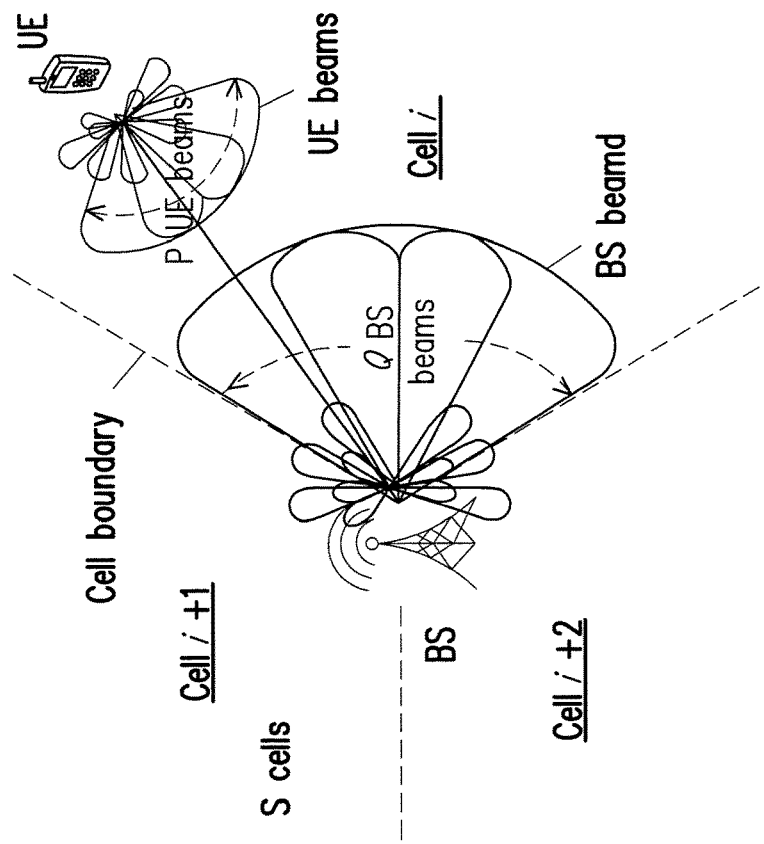
FIG. 9 illustrates an mmWave communication process for the second category of mmWave communication system in accordance with one of the exemplary embodiments of the disclosure.
Figure 9:
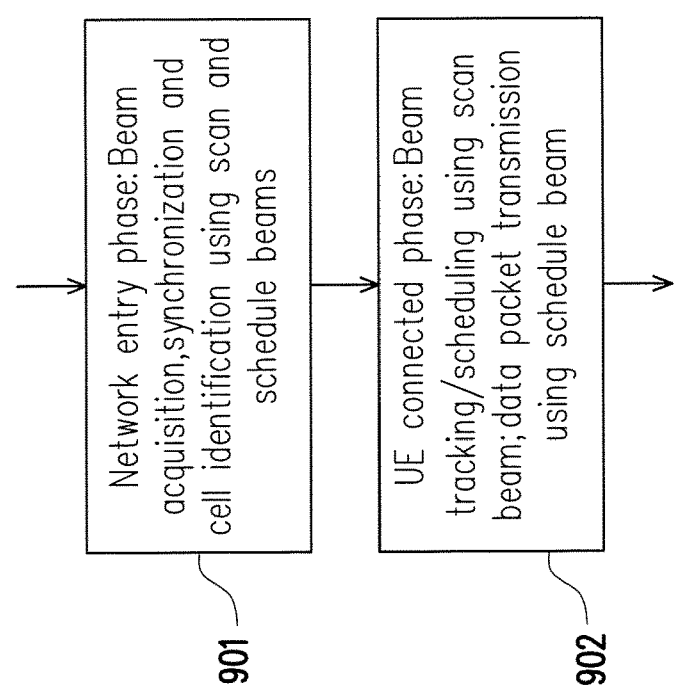

FIG. 9 illustrates an mmWave communication process for a communication system that only uses mmWave RAT (second category). For the proposed mmWave wireless communication system, there could be at least two main phases. The first phase is the network entry phase 901, and the second phase is the UE connected phase 902. For the network entry phase 901, beam acquisition, time/frequency synchronization and cell identification (including cell search) could be accomplished by using both BS 'scan' (or called control) beams and 'schedule' (or called data) beams during the network entry procedure. A UE is in the network entry phase 901 when the UE powers on, obtains system information of a cell to connect to and performs random access procedure. After the random access procedure has been completed, the UE may enter the UE connected phase 902. For the UE connected phase 902, beam tracking/scheduling could be accomplished by using only the BS scan beam, and thus data packet transmission by using BS schedule beams could then be accomplished when the UE has been connected.

Figure 10:
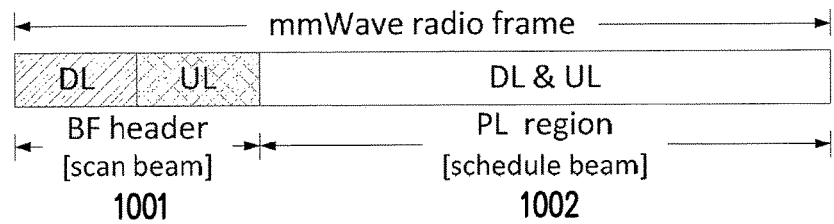
FIG. 10 illustrates a configurable frame structure of an mmWave communication system in accordance with one of the exemplary embodiment of the disclosure.

FIG. 10 illustrates a frame structure of an mmWave communication system in accordance with one of the exemplary embodiments of the disclosure. The frame structure would include not limited to a beamforming (BF) header region 1001 and a payload (PL) region 1002. The BS scan beams and BS schedule beams could be respectively used in BF header 1001 and the PL region 1002. Beam acquisition, beam tracking, cell identification (including cell search) and synchronization could be performed in BF header 1001 by using the BS scan beams. Beam scheduling for DL/UL packet data transmission could be performed in the PL region 1002 by using the BS schedule beams.

Figure 11:
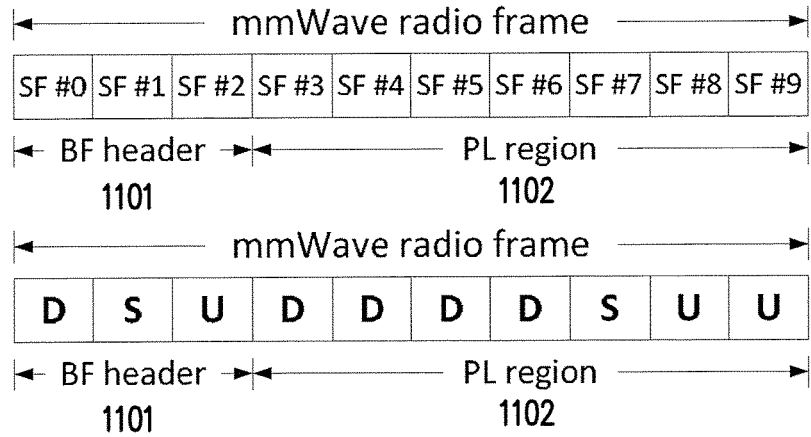
FIG. 11 illustrates an example of LTE TDD based mmWave radio frame according to exemplary embodiment of the present invention.

FIG. 11 illustrates an example of LTE TDD based mmWave radio frame according to exemplary embodiment of the present disclosure. An mmWave radio frame could be demarcated into ten subframes (SFs) or any number of arbitrary subframes. In the example of FIG. 11, the first 3 subframes or so could belong to the BF header 1101 and may generally include a DL and/or a UL and/or a special subframe. The remaining 7 subframes or so would belong in the PL region 1102 and may also include the DL and/or UL and/or special subframes which could be configurable by the network or the BS. Also in the example of FIG. 11, D, S, and U denotes the DL, special and UL subframes, respectively. Note that S may follow by D and precede U when D is switched to U, but S would typically be absent when U is switched to D.

Figure 12:
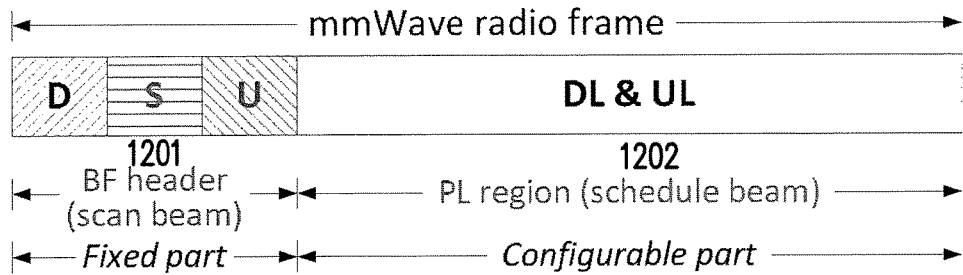
FIG. 12 illustrates a configurable frame structure for TDD in accordance with one of the exemplary embodiments of the disclosure.

FIG. 12 illustrates a configurable frame structure for TDD in accordance with one of the exemplary embodiments of the disclosure. For this exemplary embodiment, the BF header 1201 could be structurally fixed and contain, for example, a D, S, and U. However, the remaining 7 subframes contained in the PL region 1202 could be configurable according to the user requirements, channel conditions and/or network capability. This would mean that, for example, if any of the 7 subframes has been assigned as a DL subframe, this DL subframe could be changed to an UL subframe or a special subframe by the network or the BS.

FIG. 13 illustrates an example of a configurable frame structure for TDD in accordance with one of the exemplary embodiments of the disclosure. A lookup table could be stored in memory and records various DL-UL configurations. This table would be similar to the current LTE DL-UL configuration table, but a frame would be divided into a BF header region followed by a PL region. The BF header would contain a number of BF header subframes such as three in this example, and the PL region would contain a number of PL region subframes.

Figure 14:
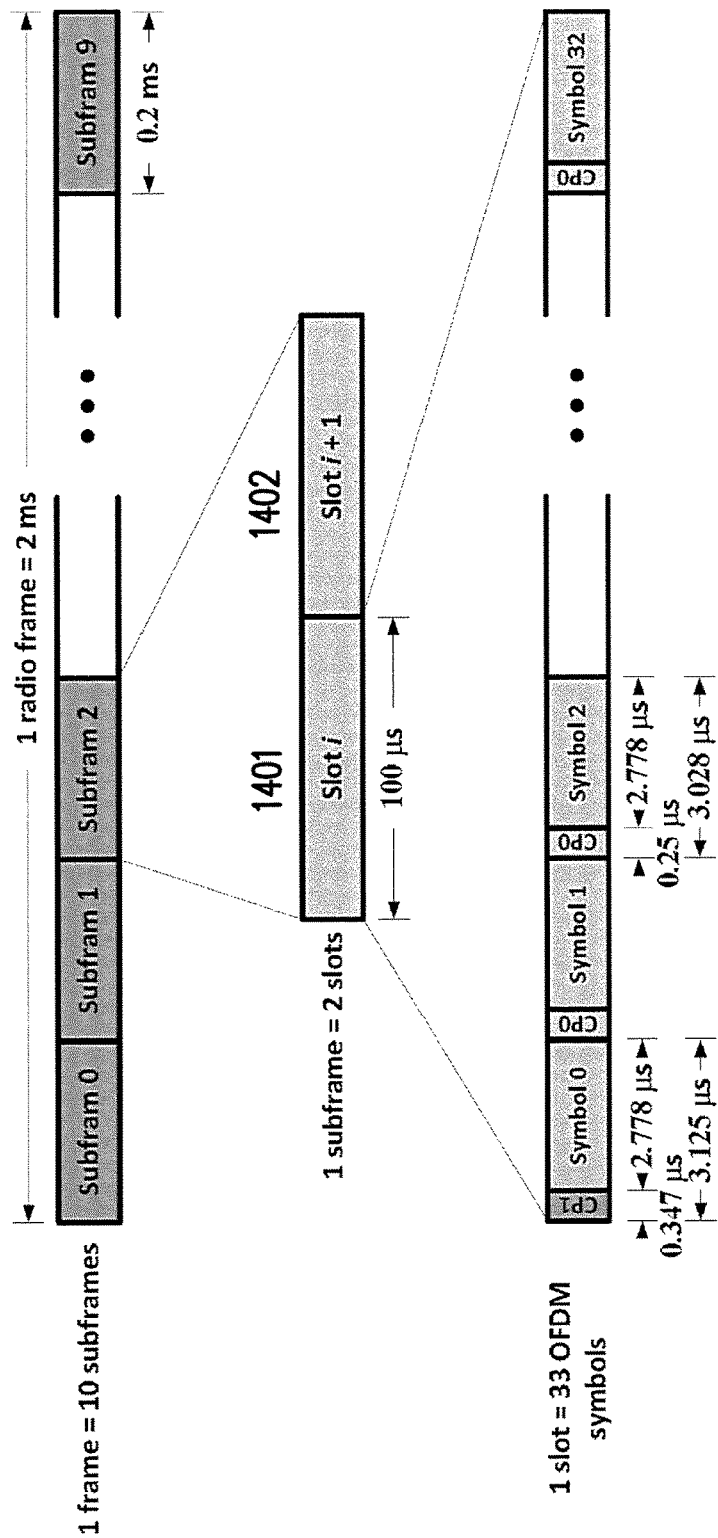
FIG. 14 illustrates an example of LTE based TDD mmWave frame structure in accordance with one of the exemplary embodiments of the disclosure.

FIG. 14 illustrates an example of LTE based TDD mmWave frame structure in accordance with one of the exemplary embodiments of the disclosure. In this exemplary embodiment, an mmWave radio frame having a duration of 2 ms could be partitioned into 10 sub-mmWave frames or 10 subframes, and each of the subframes having a duration of 0.2 ms may have 2 time slots (e.g. 1401 1402) and each time slot (e.g. 1401) could be further partitioned into 33 OFDM symbols. The cyclic prefix (CP) lengths of the first OFDM symbol, which could be 0.347 microseconds (μs) for example, could be different from the remaining OFDM symbols, which could be 0.25 μs for example, in each of the two slots. It should be apparent to ordinary persons skilled in the art that the duration and number of each subframe, slot, and symbol may vary according to different design considerations.

Figure 15:
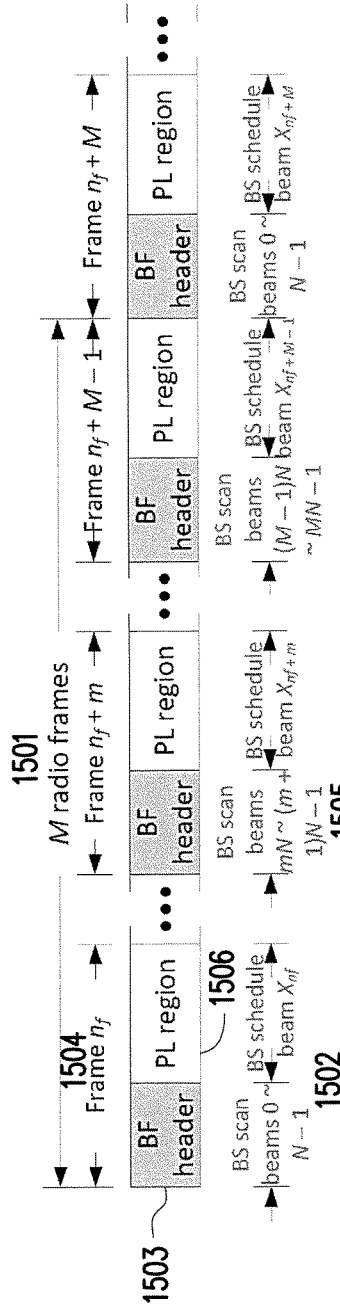
FIG. 15 illustrates using mmWave frames to carry beamforming information in accordance with one of the exemplary embodiments of the disclosure.

FIG. 15 illustrates using mmWave frames to carry beamforming information in accordance with one of the exemplary embodiments of the disclosure. Assuming that a BS is transmitting Q scan beams having Q different sequences with each beam having a different ID, and thus there would be Q different IDs. It is also assumed that the Q scan beams could be deterministically defined and sequentially transmitted over M mmWave radio frames (e.g. 1501), and each BF header (e.g. 1503) of a radio frame (e.g. 1501) would be allocated with N scan beams where N=Q/M. The allocation of the Q beams may repeat every M mmWave radio frames. The parameter 'M' in this exemplary embodiment could be a beacon period of the Q BS scan beams. Thus, BS scan beams mN~(m+1)(N−1) could thus be transmitted in BF headers in frame $n_{f+m}$, where m=0, 1, 2, and etc. In this exemplary embodiment, the BS scan beams 0~N−1 (e.g. 1502) could be transmitted in BF header 1503 in frame $n_f$ 1504, BS scan beams N~2N−1 (e.g. 1505) could be transmitted in BF header in frame $n_{f+1}$, and so on. On the other hand, for the schedule beams in the PL region 1506 for this exemplary embodiment, only one of the Q schedule beams could be arbitrarily scheduled and selectively transmitted by a BS over a predetermined time duration according to the user requirements, channel conditions, network capability, and so forth.

Figure 16:
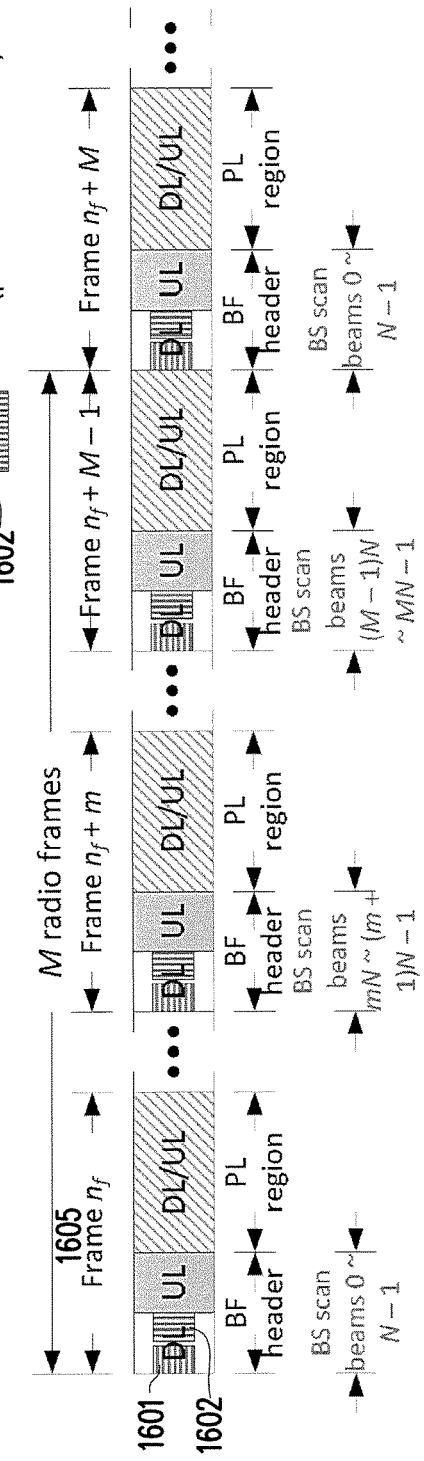
FIG. 16 illustrates transmitting periodic signaling via scan beams in accordance with one of the exemplary embodiments of the disclosure.

FIG. 16 illustrates transmitting periodic signaling via scan beams in accordance with one of the exemplary embodiments of the disclosure. The periodic signaling has a beacon signaling like behavior and is transmitted from a BS to at least one UE. FIG. 16 shows that within each mmWave radio frame such as frame $n_f$ 1605, 'beam search signal (BSS)' 1601 and 'cell search signal (CSS)' 1602 could be allocated in the BF header and transmitted via scan beams from a BS to the at least one UE. The BSS 1601 assigned with a beam ID with a beacon period of M frames could be used for beam acquisition or could be used for beam search in network entry mode (phase) 901, beam tracking (i.e. beam search for data transmission in UE connection mode (phase) 902) and timing/frequency synchronization. The CSS 1602 assigned with a cell ID with a beacon period of one frame could be used for cell identification and timing/frequency synchronization (if needed). The BSS 1601 and CSS 1602 may have different sequence formats which means that the generation of the beam sequences would be independent of the generation of the cell sequence. Also as previously described, each cell could have Q BS beams and the same set of Q beam sequences.

Figure 17:
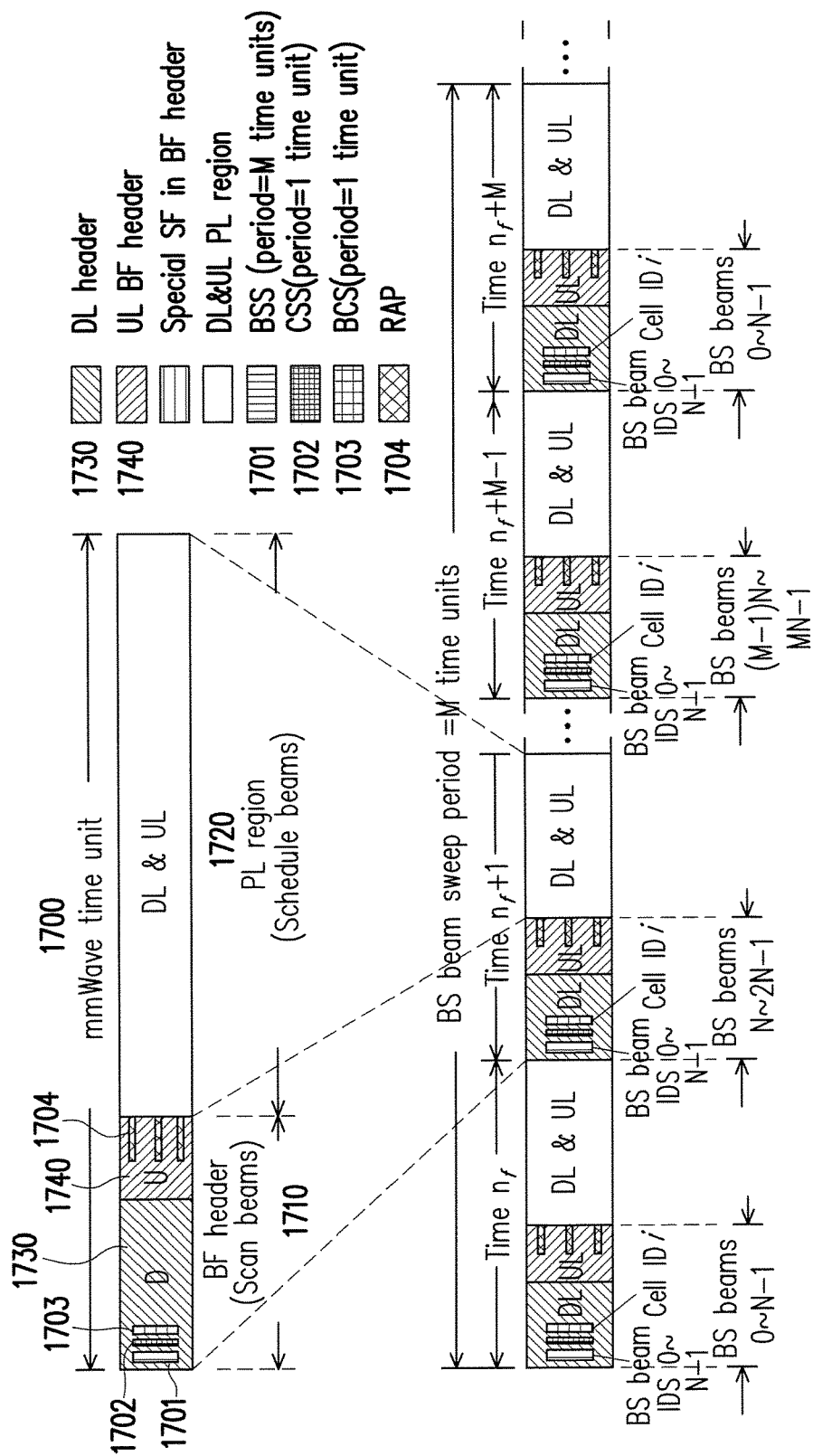
FIG. 17 illustrates an exemplary mmWave frame structure used during a network entry phase in accordance with one of the exemplary embodiments of the disclosure.

FIG. 17 illustrates an exemplary mmWave frame structure used during a network entry phase in accordance with one of the exemplary embodiments of the disclosure. For this exemplary embodiment, a number of periodic signals could be allocated and transmitted in a BF header by using scan beams transmitted from a BS to a UE during the network entry phase. For this exemplary embodiment, the repeating mmWave frame structure of a single mmWave time unit 1700 would include not limited to a BF header 1710 transmitted via scan beams sequentially swept by the BS and a PL region 1720 transmitted via schedule beams scheduled by the BS. The BF header 1710 would include not limited to a DL BF header 1730 and a UL BF header 1740. The DL BF header 1730 would include not limited to a BSS 1701, a CSS 1702, and a BCS 1703. The UL BF header 1740 would include not limited to a RAP 1704.

The beam search signal (BSS) 1701 in this exemplary embodiment is denoted as $s_{BSS,q}$, $0 \leq q \leq Q-1$, where the beam ID q could be transmitted by the BS in DL BF header 1730 via the BS scan beam q every M frames to UE for purposes including a BS beam ID detection for beam acquisition, automatic gain control (AGC) at UE, and time or frequency synchronization. The property of the BSS would include repetitions in the DL BF header 1730 in the time domain or down-sampling in the frequency domain. The same set of Q BBS's could be reused across multiple cells by different BSs. The cell search signal (CSS) 1702 is denoted as $s_{CSS,i}$, $0 \leq i \leq S-1$, where the cell ID i could be transmitted by the BS in DL BF header 1730 via the BS scan beams every frame to UE. The purposes of the CSS would include cell ID detection. Each CSS would correspond to one of the Q scan beams, and also each CSS in N transmissions would have the same cell ID.

The broadcast signal (BCS) 1703 denoted as $s_{BCS}$ could be transmitted by the BS in DL BF header 1730 via the BS scan beam every time unit to UE for system information (including for example the system bandwidth configuration and TDD DL/UL configuration for PL region 1720) detection. The random access preamble (RAP) 1704 is a contention based RAP denoted as $s_{RAP}$ which could be transmitted by a UE in a UL BF header (e.g. 1740) via a (best) BS scan beam every frame to the BS for timing advance (TA) calculation.

For the exemplary embodiment of FIG. 17, a BS would transmit a plurality of DL periodic signals in one or more DL resource of a DL beamforming header 1730 of an mmWave time unit 1700 by using one or more BS scan beam during the network entry mode 901. The periodic signal has a plurality of time units, and each time unit (e.g. 1700) could be in a frame, a subframe, a time slot, one or more OFDM symbols, and so forth. The DL periodic signals may include not limited to a BSS 1701, CSS 1702, BCS 1703, and so forth.

The generation of the BSS 1701 would be independent of the CSS 1702. The BSS 1701 may repeat multiple times in a DL BF header 1730 in time domain or down-sample in frequency domainBS. One BSS could be expressed by one unique code per BS beam, but the same set of a plurality of BSS's could be used across multiple BSs. As for the CSS 1702, the same CSS 1702 could also be transmitted in every BS scan beam. In response to the plurality of DL periodic signals transmitted from the BS, one or more UE may use its scan beams to receive the DL periodic signals per BS scan beam transmission in a DL BF header 1730 during the network entry mode 901. In other words, a UE would also sweep its scan beams in a sequential manner in order to detect transmissions from the BS. Assuming that the number of BS scan beams used in each DL BF header (e.g. 1730) is expressed as N, where ($1 \leq N \leq Q$), the number of UE scan beams used in each BS can beam transmission could be expressed as L, wherein ($1 \leq L \leq P$). The parameter L could be known by the UE but unknown to the BS as the UE scan beams sequentially sweep its beams per BS scan beam transmission. BSThe UE scan beams L (L=1, 2, . . . , P) per BS scan beam transmission in any DL BF header (e.g. 1730) could be determined by the UE without the knowledge of the BS. The UE would perform scan beam sweep with a sweep period of K=MP/L time units.

Figure 18:
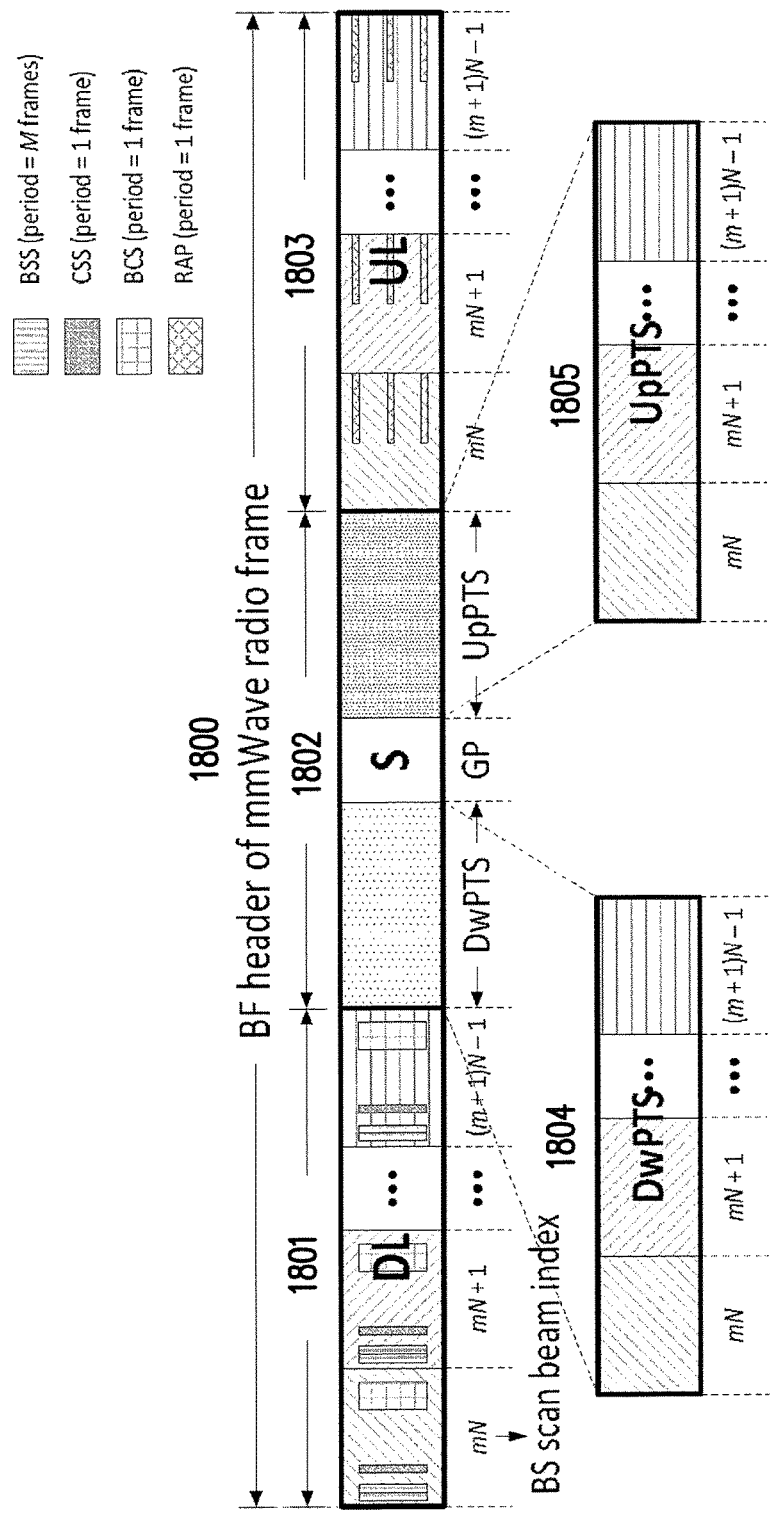
FIG. 18 illustrates a BF header in accordance with one of the exemplary embodiments of the disclosure.

FIG. 18 illustrates a BF header in accordance with one of the exemplary embodiments of the disclosure. Besides allocating BSS, CSS, and BCS in a DL BF header (e.g. 1730), these signals may also be allocated in a DL special subframe and started from any of the BS scan beams. Referring to FIG. 18 which shows a BF header 1800 of an mmWave radio frame, the BF header 1800 may include not limited to a DL BF header 1801, a special subframe 1802, and an UL BF header 1803. An RAP could be allocated in a UL BF header 1803 or be allocated in UL portion of the special subframe 1802 and started from any of the BS scan beams. Multiple BS scan beams could be used and periodically and sequentially swept by the BS in the BF header. The number of scan beams in a DL BF header 1801 and the UL BF header 1803 could be the same. However, the number of scan beams used in a DL (i.e. downlink pilot time slot, DwPTS) or a UL (i.e. uplink pilot time slot, UpPTS) transmission of special subframe 1802 could be either the same or different from the number of scan beams in a DL BF header 1801 or in a UL BF header 1803.

It is worth noting that a guard period (GP) is needed for DL-to-UL switch. The DL BF header 1801 or the UL BF header 1803 could be partitioned into N zones, mN~(m+1)N−1, where 0≤m≤M−1, each of the N zones could be transmitted via a unique one of N BS scan beams if N BS scan beams are used per DL BF header 1801 or the UL BF header 1803. In such case, BSS, CSS and BCS could be transmitted in each of the N zones of the DL BF header 1801 and RAP could be transmitted in each of N zones of the UL BF header 1803. Except for BSS, the above signals including the same CSS, BCS, and RAP could be repetitively transmitted in each of the N zones. The (mN+n)th BSS with BS beam ID mN+n could be transmitted via the (mN+n)th one of the mN~(m+1)N−1 BS scan beams, where 0≤m≤M−1, 0≤n≤N−1 and MN=Q.

Figure 19:
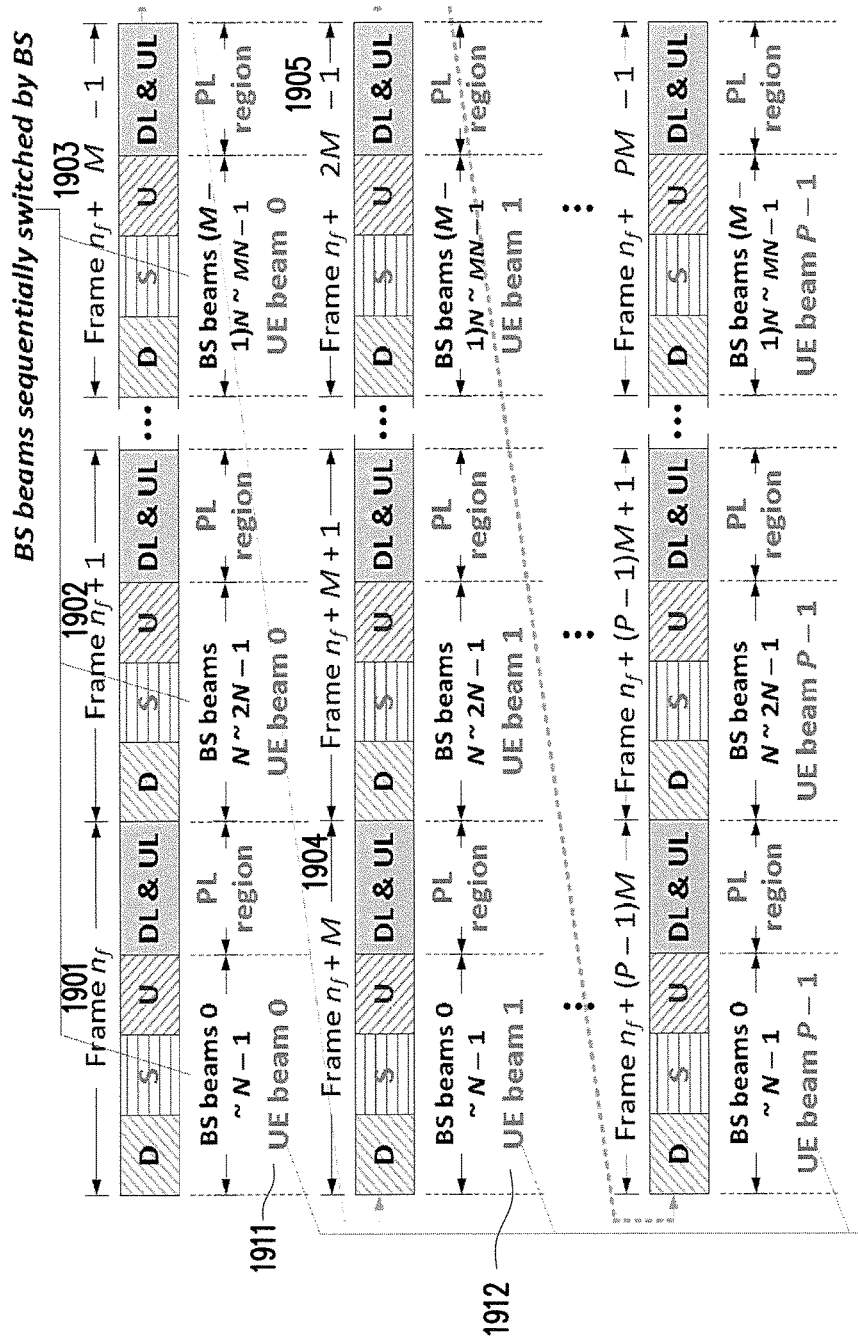
FIG. 19 illustrates BS scan beam sweep and UE scan beam sweep during UE beam acquisition in a network phase in accordance with one of the exemplary embodiments of the disclosure.

FIG. 19 illustrates BS scan beam sweep and UE scan beam sweep during UE beam acquisition in a network entry mode 901 in accordance with one of the exemplary embodiments of the disclosure. For this exemplary embodiment, it is assumed that Q scan beams are used by a BS and P scan beams are used by a UE. The Q BS scan beams could be sequentially swept to by the BS so that beams 0~N−1 could be transmitted by the BS in BF header in frame $n_f$ 1901, beams N~2N−1 could be transmitted by the BS in BF header in frame $n_f$+1 1902, and so on. On the other hand, UE beam 0 1911 could be sequentially transmitted by the UE in BF header in frame of 1901~$n_f$+M−1 1903, UE beam 1 1912 could be sequentially transmitted in BF header in frame $n_f$+M 1904~$n_f$+2M−1 1905 and so on, where $M_{max}$=Q. BSThe beacon period of UE scan beams in this exemplary embodiment is larger than the beacon period of BS scan beams although this does not necessarily have to be the case.

Figure 20:
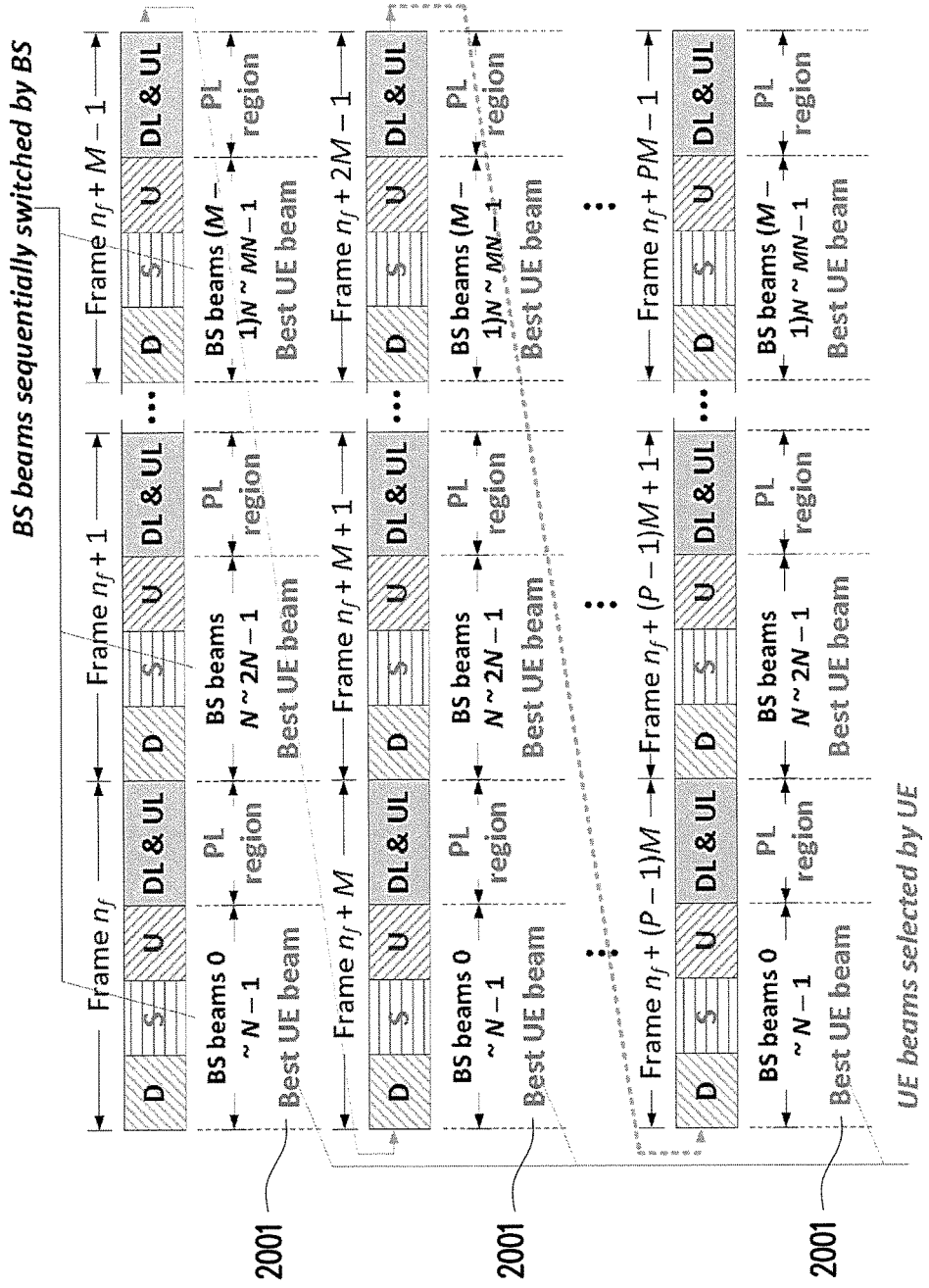
FIG. 20 illustrates BS scan beam sweep and UE scan beam sweep after UE beam acquisition in a network entry phase in accordance with another one of the exemplary embodiments of the disclosure.

FIG. 20 illustrates BS scan beam sweep and UE scan beam sweep after UE beam acquisition in a network entry mode 901 in accordance with another one of the exemplary embodiments of the disclosure. For this exemplary embodiment, it is assumed that Q scan beams are used by a BS and P scan beams are used by a UE. The Q BS scan beam could be sequentially swept by the BS so that beams 0~N−1 could be transmitted by the BS in the BF header of frame $n_f$, beams N~2N−1 could be transmitted the BS in the BF header of frame $n_f$+1, and so on. However, for this exemplary embodiment, the best (preferred) UE beam 2001 would be selected (and not sequentially swept from UE beam 0, UE beam1, and so forth) and used by the UE in the BF header after the best or preferred UE scan beam 2001 has been identified until the UE moves out of field-of-view (FoV) of the current UE scan beam. The beacon period of UE scan beams in this exemplary embodiment is larger than the beacon period of BS scan beams although this does not necessarily have to be the case.

Figure 21:
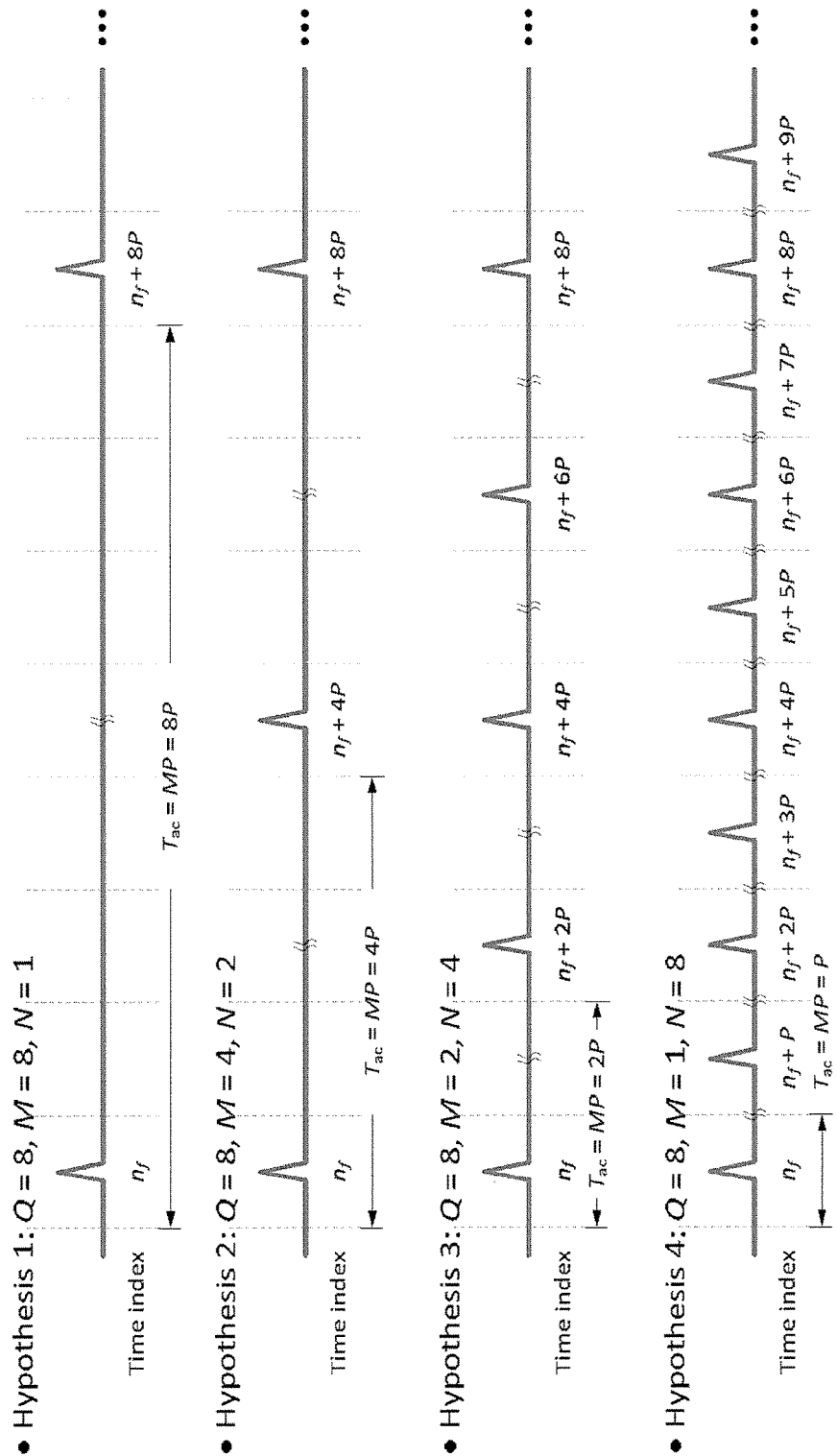
FIG. 21 illustrates blind detection of the number of bas station scan beams in an BF header in accordance with one of the exemplary embodiments of the disclosure.

The detection of number of BS scan beams during the network entry mode 901 would be elucidated as follows. Although the number of total BS scan beams Q could be fixed and known to the UE, the number of BS scan beams in BF header N may be unknown to the UE at start of the network entry mode 901. Therefore, the UE may need to blindly detect the number of BS scan beams in BF header N first. With this information, the beam acquisition, cell identification, synchronization, system information detection and etc. could then be successfully performed during the network entry mode 901. FIG. 21 illustrates blind detection of the number of bas station scan beams in an BF header in accordance with one of the exemplary embodiments of the disclosure. The autocorrelation output of the received BSS at a UE could be used for the blind detection of N as shown in FIG. 21 based on the BS and UE beam sweep mechanism previously described in FIG. 19. for which the beacon period of UE beams is larger than that of BS beams. Referring to FIG. 21, assuming that Q=8 beams and P beams are respectively used at the BS and UE, there are four hypotheses for N: (1) M=8, N=1, (2) M=4, N=2, (3) M=2, N=4 and (4) M=1, N=8. For each hypothesis, the beacon period of UE beams is $T_{BP, UE}$=MP for L=1 during UE beam acquisition. Considering hypothesis 3 for example (i.e. M=2, N=4) as shown in FIG. 21, it could be known that the beacon period of UE beams would be $T_{BP, UE}$=MP=2P.

According to the exemplary embodiment shown in FIG. 21, it could be known that the beacon period of UE beams is $T_{BP, UE}$=MP during UE beam acquisition so the blind detection time $T_{BD}$ would be a multiple of maximum beacon period of UE beams $\alpha T_{BP,UE,max}$, that is $T_{BD}=\alpha T_{BP,UE,max}$, where α=1, 2, . . . , and $T_{BP,UE,max}=M_{max}P$=QP. This is because that sufficient statistics (i.e. the number of 'reliable' peaks) of the autocorrelation outputs of received BSS are needed to ensure the successful acquisition rate in blind detection. Reliable peak is defined as a peak that its value is within a predefined confidential range. The minimum requirement of blind detection time could be $T_{BD,min}=T_{BP,UE,max}$ (i.e. α=1).

Figure 22:
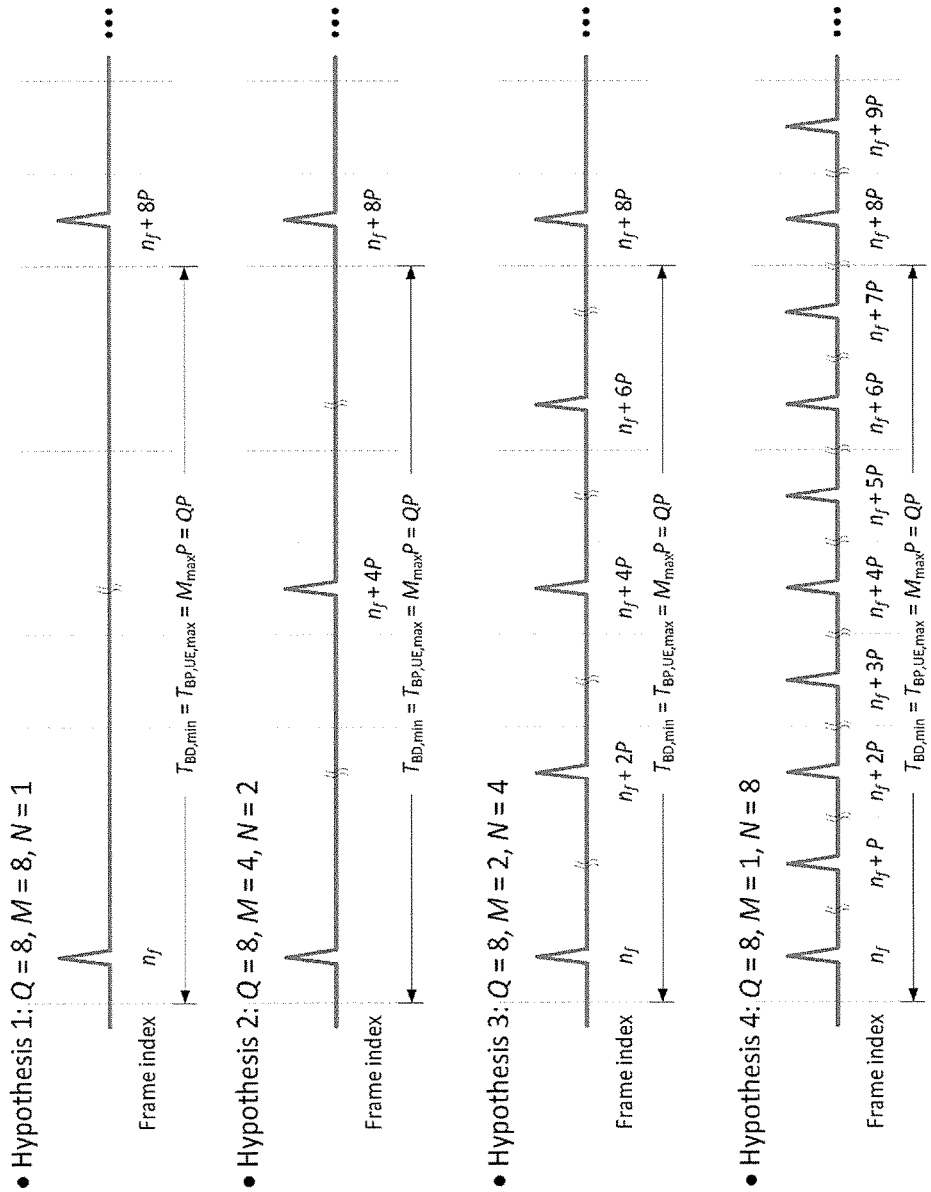
FIG. 22 illustrates an example of minimum blind detection time for detecting the number of BS scan beams in BF header in accordance with one of the exemplary embodiments of the disclosure.

FIG. 22 illustrates an example of minimum blind detection time for detecting the number of BS scan beams in BF header in accordance with one of the exemplary embodiments of the disclosure. Similar to FIG. 21, it is assumed that Q=8 beams and P beams are respectively used at the BS and the UE, and there are four hypotheses for N: (1) M=8, N=1, (2) M=4, N=2, (3) M=2, N=4 and (4) M=1, N=8. For this exemplary embodiment, the minimum blind detection time in this case could thus be $T_{BD,min}=T_{BP,UE,max}=M_{max}P$=QP=8P.

Figure 23:
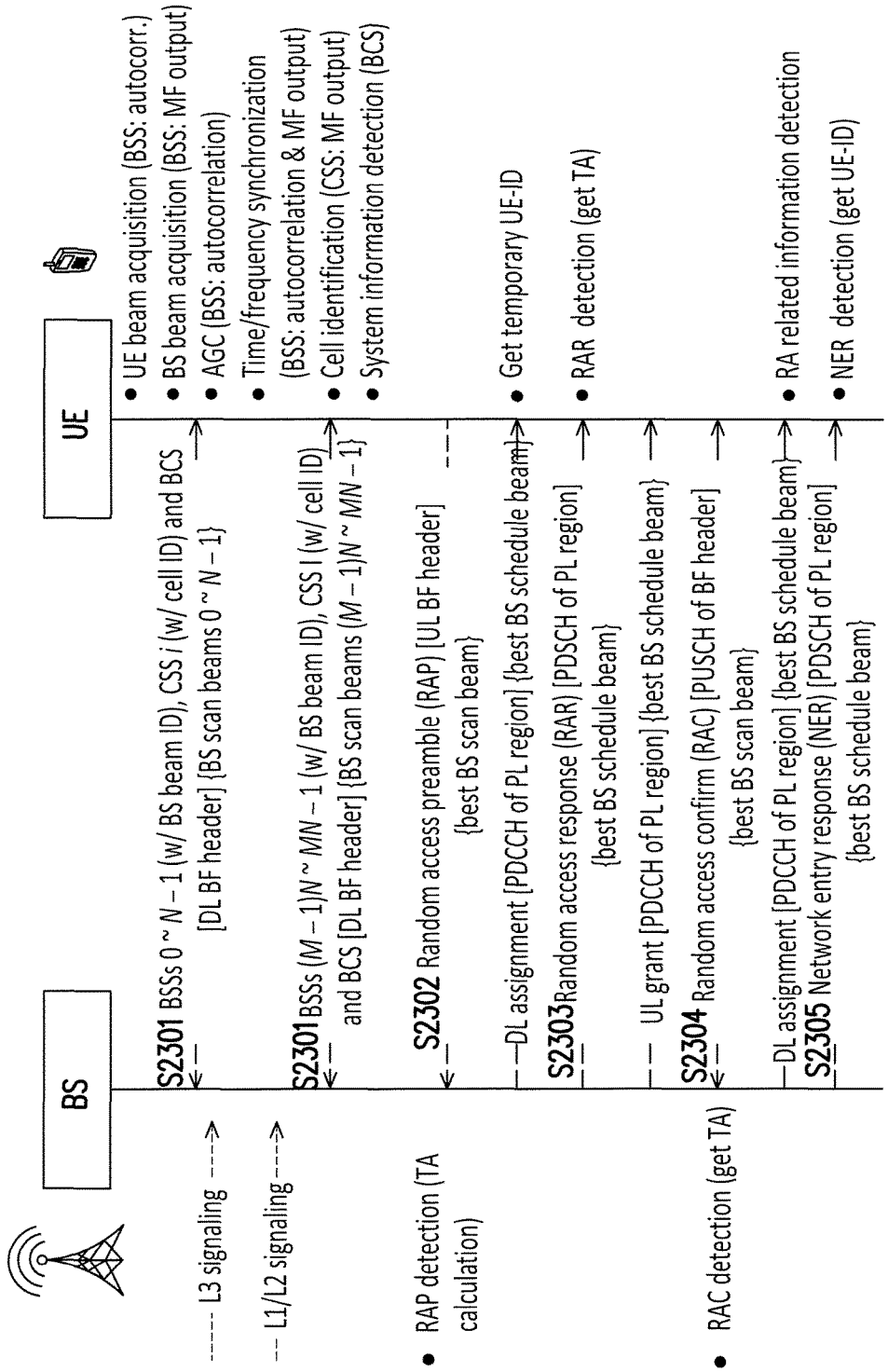
FIG. 23 illustrates a network entry procedure with beam processing in accordance with one of the exemplary embodiments of the disclosure.

FIG. 23 illustrates a proposed network entry procedure with beam processing in accordance with one of the exemplary embodiments of the disclosure. The proposed network entry procedure may include not limited to beam acquisition, AGC at UE, time/frequency synchronization, cell identification, SI detection and TA adjustment. In step S2301, a BS may transmit mmWave time units in which multiple BSSs mN~(m+1)N−1 having N BS beam IDs and CSS i having a cell ID could be transmitted via DL BF headers on BS scan beams mN~(m+1)N−1 per mmWave time unit. In step S2301-1, in response to receiving the BSSs, the UE would perform autocorrelation of the received BSSs in the DL BF header to identify UE beam, detect timing, and adjust AGC.

The UE beam acquisition based on the peak of autocorrelation output of received BSSs could be performed per PM time units because the Q BS beams are transmitted over M time units and one (i.e. L=1) of P UE beams is used per M time units. The UE beam acquisition time in terms of time units could be expressed as $T_{ac,UE}$=aPM, a=1, 2, and so forth. The frame timing detection based on autocorrelation peak location detection could be performed per PM time units because Q BS beams are transmitted over M time units and one (i.e. L=1) of P UE beams is used per M time units. Frame timing maintenance could be performed per M time units after the best UE beam has been identified. AGC initialization based on maximum value of autocorrelation of BSSs could be set per PM time units because Q BS beams are transmitted over M time units and one (i.e. L=1) of P UE beams is used per M time units. AGC maintenance could be performed per M time units after the best UE beam has been identified.

In step S2301-2, the Matched-filter (MF) output of received BSS at UE with Q BSSs in DL BF header could be used to detect BS scan beam ID and frequency offset (FO). For BS beam acquisition, BS scan beam (or BS beam ID) acquisition based on the peak of MF output could be performed per QM time units because Q BS beams are transmitted over M time units and one of Q BSSs is matched per M time units. The BS beam acquisition time in terms of time units could be expressed as: $T_{ac,BS}$=bQM, b=1, 2, and so forth. For frequency detection and maintenance, the frequency detection and maintenance could be performed based on the phase difference between any two peaks of MF output per M time units after the best BS beam has been identified. In step S2001-3, the MF output of received CSS at the UE with S CSSs in DL BF header could be used to detect the cell ID (and time/frequency offset if needed). The cell identification and cell link monitoring could be accomplished independently from BS/UE beam acquisition per S time units because that total S CSSs (cells) needs to be checked per time unit. In step S2001-4, the received BCS at UE in DL BF header could be used to detect system information (SI). The SI detection could be accomplished per time unit to obtain, for example, the system bandwidth, TDD DL/UL configuration, and so forth by following packet data transmission.

In step S2302, the UE may transmit to the BS a random access preamble (RAP) via a random access channel (RACH) in UL BF header on the best UE beam and the best BS scan beam after the BS-to-UE beam has been aligned, time/frequency has been detected, and cell ID has been identified to enable the BS to calculate a timing advance (TA) value for the UE to perform TA. A contention based sequence (or a sequence randomly selected by UEs) with sequence index and periodicity could be used to generate the RAP.

In step S2303, the BS may transmit to the UE a random access response (RAR) which may embed the TA value. The RAR could be transmitted via a physical downlink shared channel (PDSCH) of the PL region on the best UE beam and the best BS schedule beam after 1 time units from RAP transmission to allow the UE to obtain the TA value, which could be regarded as an L3 signaling (i.e. a DL media access control (MAC) payload by a number of, for example 11, bits) in order to further ensure the DL capability of the BS schedule beam. A DL assignment with a temporary UE-ID could be allocated by the BS for the current PDSCH of PL region based on a specific downlink control information (DCI) format.

In step S2304, the UE may transmit a random access confirm (RAC) which embeds the TA value via a physical uplink shared channel (PUSCH) of BF header on the best UE beam and the best BS scan beam after m time units from RAR transmission to allow the BS to confirm whether the TA value that has been received by UE is correct or not. This TA value transmitted via PUSCH could be regarded as the L3 signaling (i.e. a DL MAC payload by a number of, for example 11, bits). A UL grant could be allocated by the BS for current PUSCH of PL region based on another specific DCI format.

Figure 24:
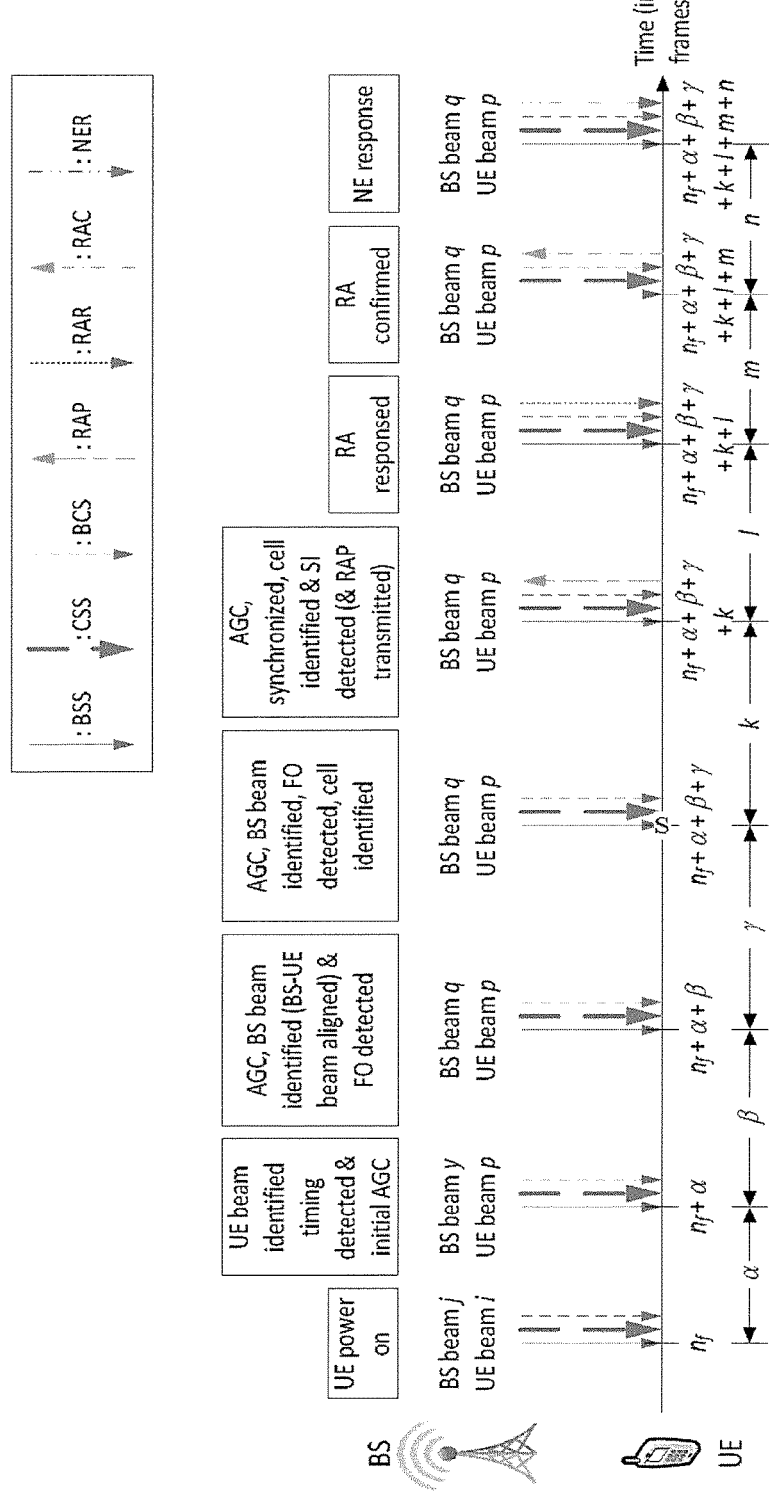
FIG. 24 illustrates the proposed network entry procedure across a time line in accordance with one of the exemplary embodiment of the disclosure.

In step S2305, a BS may transmit to the UE a network entry response (NER) which embeds the UE-ID. The NER could be transmitted by the BS via PDSCH of PL region on the best UE beam and the best BS schedule beam after n time units from RAC transmission to allow the UE to obtain a UE-ID. The UE ID could be regarded as another L3 signaling (i.e. a DL MAC payload by a number of, for example 16, bits). A DL assignment with a non-contention based (or BS assigned) RA sequence including the information of sequence index and periodicity could be allocated by the BS for current PDSCH of PL region based on another specific DCI format in order for the UE to perform TA maintenance during the following packet data transmission. An example of a network entry procedure in the time domain is shown in FIG. 24.

Figure 25:
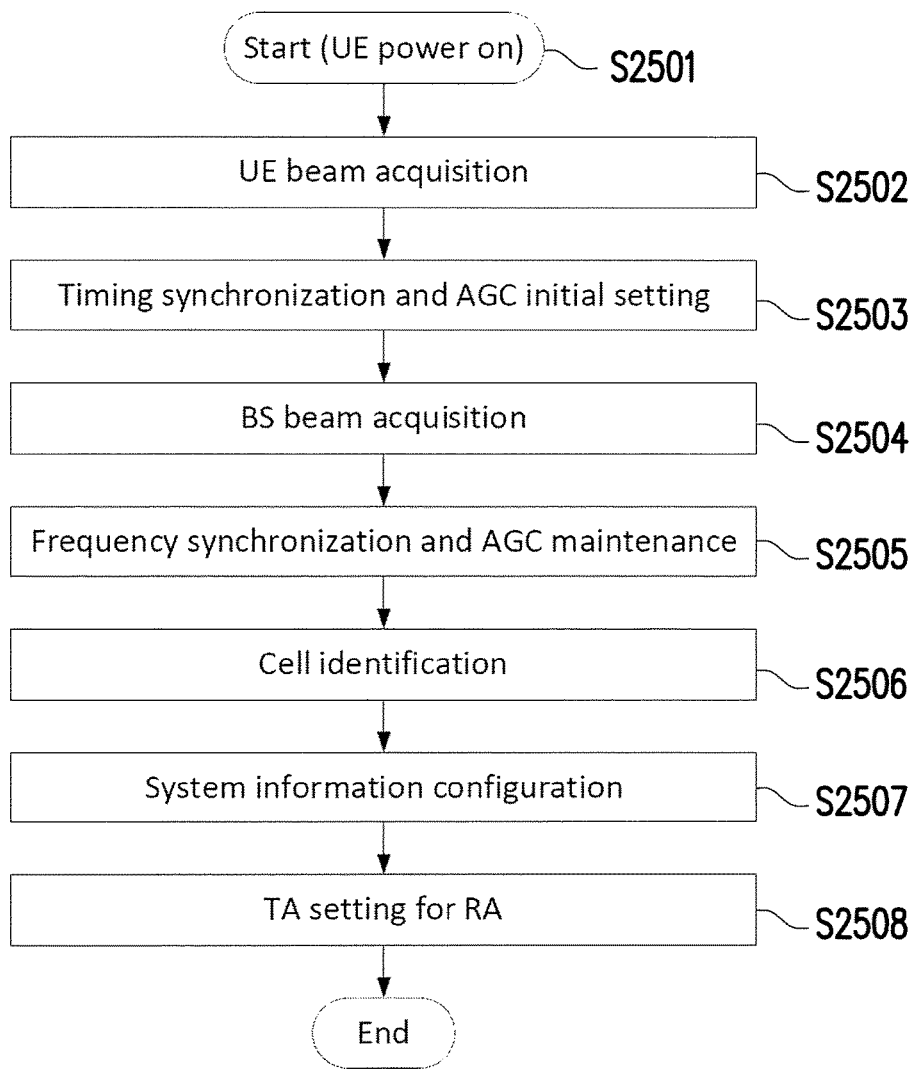
FIG. 25 is a flow chart which illustrates a network entry procedure with beam processing in accordance with one of the exemplary embodiments of the disclosure.

FIG. 25 is a flow chart which illustrates a network entry procedure with beam processing in accordance with one of the exemplary embodiments of the disclosure. After step S2501 during which a UE powers on or comes off a sleep mode, in step S2502, the UE would proceed with UE beam acquisition by performing the autocorrelation output of received BSS. After the best UE beam has been selected, in step S2503, frame timing could be detected and initial AGC could be set respectively based on the peak location and peak value of the autocorrelation output of received BSS. In step S2504, the BS beam acquisition could then be accomplished by using the matched filter output of received BSS with Q BSSs. In this step, AGC could be determined and fixed, and the best BS beam would be selected. In step S2505, frequency offset could be detected and AGC could be maintained based on the phase difference between any two peaks of the MF output of received BSS with Q BSSs. In step S2506, cell identification could be accomplished by using the matched filter output of received CSS. In step S2507, the system information could be detected based on the received BCS. In step S2508, timing advance (TA) is set for random access (RA).

Figure 26:
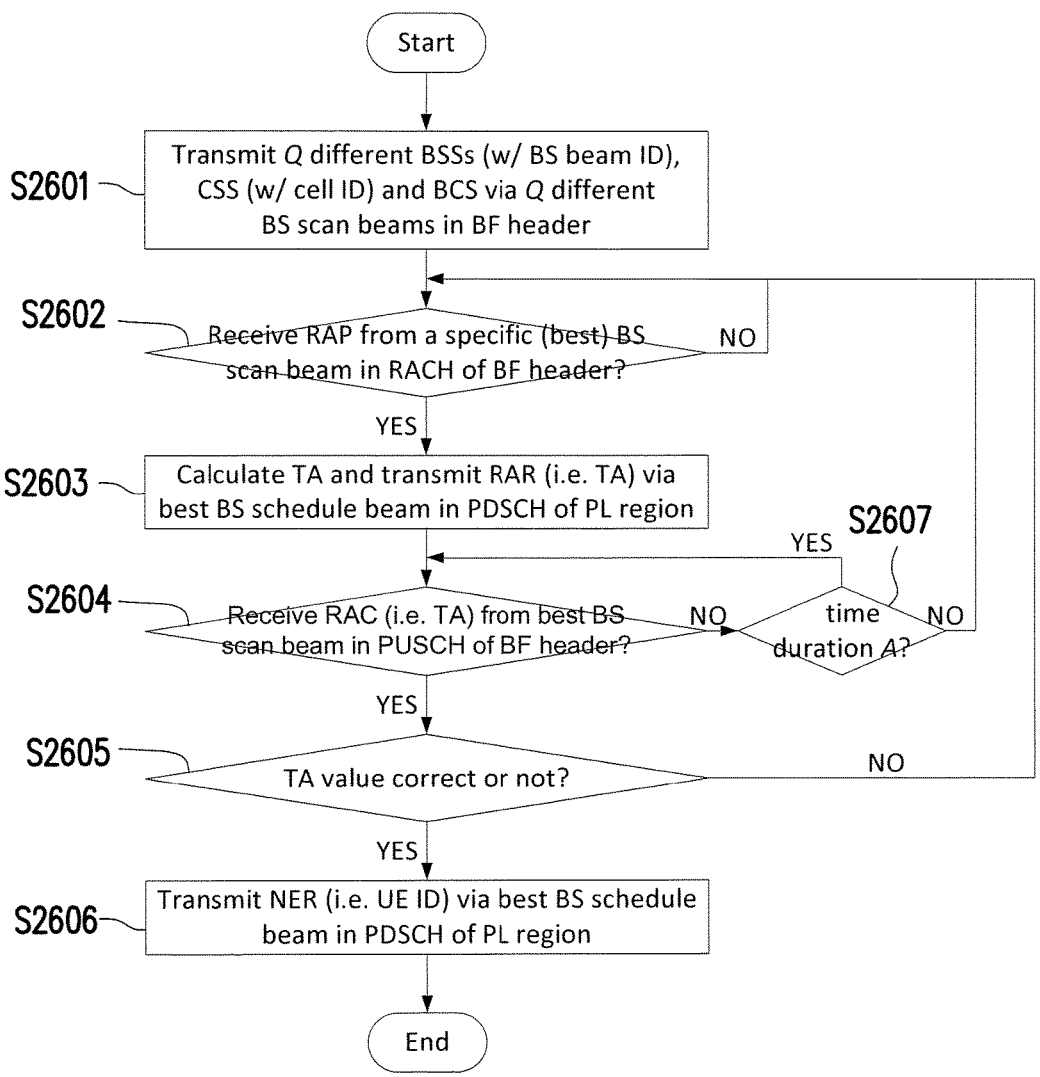
FIG. 26 is a flow chart which illustrates a network entry procedure with beam processing from the perspective of a BS in accordance with one of the exemplary embodiments of the disclosure.

FIG. 26 illustrates an example of overall signal flow chart at BS for network entry procedure according to exemplary embodiment of the present invention. In step S2601, the BS would continuously transmit Q scan beams with each scan beams having a different BSS which implicates a different beam ID in a DL BF header which would also include the CSS which implicates cell ID and the BCS. In step S2602, the BS would determine whether a RAP transmitted from a UE has been received from a specific (and best) BS scan beam in the random access channel (RACH) of the BF header. If not, step S2602 is to be repeated; otherwise step S2603 would proceed. In step S2603, the BS would calculate the timing advance (TA) value based on the received RAP and subsequently transmit a RAR by using the calculated TA value to UE via the best BS schedule beam in PDSCH of PL region. In step S2604, the BS would determine whether a random access confirm (RAC) with the TA value transmitted by UE has been received or not from the best BS scan beam in a PUSCH of a BF header. If so, step S2605 would be executed. Otherwise, step S2607 would be executed by waiting and checking this value within a predefined time duration A which is a number greater than zero number. If the time of waiting has exceeded the predefined time duration A, then step S2602 would be repeated; otherwise the procedure will proceed from step S2604. In step S2605, the BS would determine whether the received TA value is correct or not. If so, step S2606 would be executed; otherwise step S2602 would be repeated. In step S2606, the BS would transmit to the UE a NER which includes a UE ID via the best BS schedule beam in PDSCH of PL region.

Figure 27:
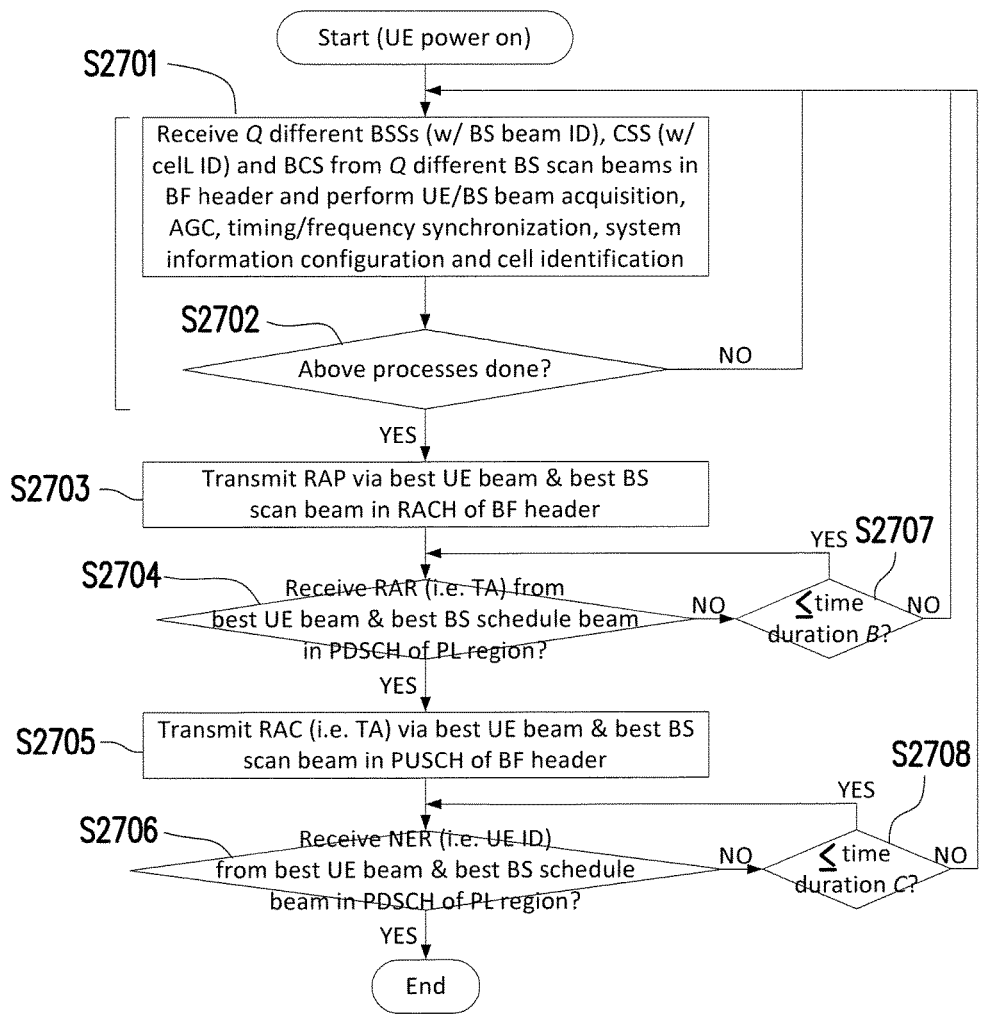
FIG. 27 illustrates is a flow chart which illustrates a network entry procedure with beam processing from the perspective of a user equipment in accordance with one of the exemplary embodiments of the disclosure.

FIG. 27 illustrates is a flow chart which illustrates a network entry procedure with beam processing from the perspective of a user equipment in accordance with one of the exemplary embodiments of the disclosure. In step S2701, after the UE has powered on or come off a sleep mode, the UE would receive Q BS scan beams with each beam having a different BSS which implicate a BS beam ID in the DL BF region which also includes the CSS which implicates cell ID and the BCS. Upon receiving the scan beams, the UE would perform UE beam acquisition, AGC adjustment, BS beam acquisition, timing/frequency synchronization, system information configuration and cell identification as previously described. In step S2702, the UE would determine whether the above process has completed. In step S2703, the UE would transmit a RAP via the best UE beam to the BS via the best BS scan beam in the RACH of a BF header. In step S2704, the UE would could check whether the RAR with a TA value transmitted from BS via the best BS schedule beam in the PDSCH of a PL region is received or not from the best UE beam. If so, step S2705 would be executed; otherwise step S2707 would be executed. If step S2707 is executed, the BS would wait for a specific duration, B, which is a number greater than zero. If the wait time exceeds B, then step S2701 is repeated. Otherwise, the procedure proceeds from step S2704. In step S2705, in response to receiving the RAR, the UE would a transmit RAC with received TA value from the BS via the best UE beam to BS via the best BS scan beam in the PUSCH of a BF header. In Step S2706, the UE would check whether an NER with a UE ID included is received from the best UE beam and BSthe best BS schedule beam in the PDSCH of a PL region from. If not, step S2708 would be executed. In step S2708, the UE would wait for a specific duration C, which is a number greater than zero. If the wait time exceeds the specific duration, then step S2701 is repeated; otherwise, the process proceed from S2706.

The term BS (BS) in this disclosure could be synonymous, for example, with a variation or a sub-variation of an "eNodeB" (eNB), a Node-B, an advanced BS (ABS), a base transceiver system (BTS), an access point, a home BS, a relay station, a scatterer, a repeater, an intermediate node, an intermediary, satellite-based communication BSs, and so forth.

Figure 28A:
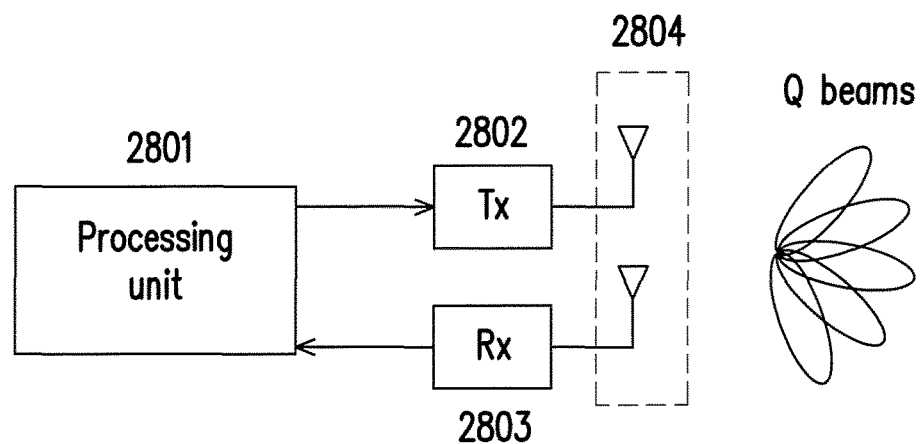
FIG. 28A illustrates the hardware diagram of a BS in terms of functional blocks in accordance with one of the exemplary embodiments of the disclosure.

FIG. 28A illustrates the hardware diagram of a BS in terms of functional blocks in accordance with one of the exemplary embodiments of the disclosure. The proposed BS of the mmWave communication system may include not limited to a processing unit 2801, an mmWave transmitter 2802, an mmWave receiver 2803, and an antenna array 2804. The mmWave transmitter 2802 and mmWave receiver 2803 may also perform operations such as low noise amplifying, impedance matching, frequency mixing, up or down frequency conversion, filtering, amplifying, and so forth. The transmitter 2802 and receiver 2803 may include one or more analog-to-digital (A/D) and digital-to-analog (D/A) converters which are configured to convert from an analog signal format to a digital signal format during uplink signal processing and from a digital signal format to an analog signal format during downlink signal processing. The antenna array includes multiple antennas which would transmit and receive directional antenna beams.

The processor(s) within the processing unit 2801 is configured to process digital signals and to perform procedures of the proposed method network entry method for an mmWave communication system in accordance with the proposed exemplary embodiments of the disclosure. Also, the processing unit 2801 may access to a non-transitory storage medium which stores programming codes, codebook configurations, buffered data, or record configurations assigned by the processing unit 2801. The processor(s) within the processing unit 2801 could be implemented by using programmable units such as a micro-processor, a micro-controller, a DSP chips, FPGA, etc. The functions of the processor(s) may also be implemented with separate electronic devices or ICs. It should be noted that the functions of processor(s) may be implemented with either hardware or software.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

Figure 28B:
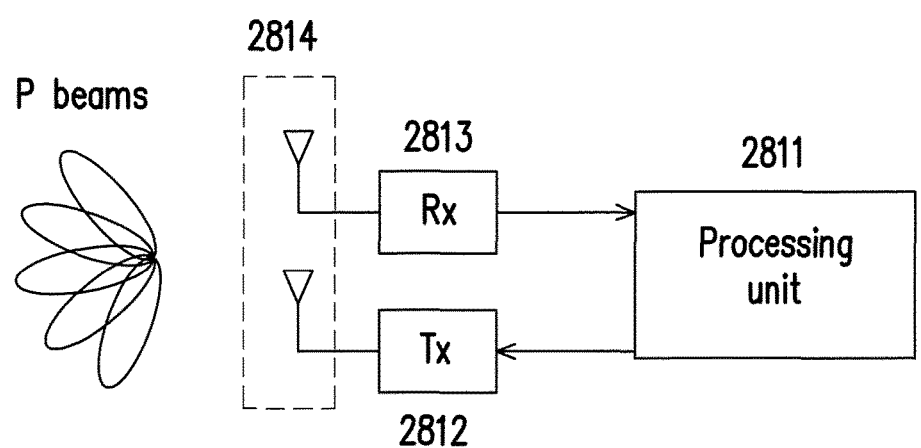
FIG. 28B illustrates the hardware diagram of a user equipment in terms of functional blocks in accordance with one of the exemplary embodiments of the disclosure.

FIG. 28B illustrates the hardware diagram of a UE in terms of functional blocks in accordance with one of the exemplary embodiments of the disclosure. The proposed UE of the mmWave communication system would include not limited to a processing unit 2811, an mmWave transmitter 2812, an mmWave receiver 2813, and an antenna array 2804. The mmWave transmitter 2812 and mmWave receiver 2813 may also perform operations such as low noise amplifying, impedance matching, frequency mixing, up or down frequency conversion, filtering, amplifying, and so forth. The transmitter 2812 and receiver 2813 may include one or more analog-to-digital (A/D) and digital-to-analog (D/A) converters which are configured to convert from a digital signal format to an analog signal format during uplink signal processing and from an analog signal format to digital signal format during downlink signal processing. The antenna array includes multiple antennas which would transmit and receive directional antenna beams.

The processor(s) within the processing unit 2811 is configured to process digital signals and to perform procedures of the proposed method network entry method for an mmWave communication system in accordance with the proposed exemplary embodiments of the disclosure. Also, the processing unit 2811 may access to a non-transitory storage medium which stores programming codes, codebook configurations, buffered data, or record configurations assigned by the processing unit 2811. The processor(s) within the processing unit 2811 could be implemented by using programmable units such as a micro-processor, a micro-controller, a DSP chips, FPGA, etc. The functions of the processor(s) may also be implemented with separate electronic devices or ICs. It should be noted that the functions of processor(s) may be implemented with either hardware or software.

Figure 28C:
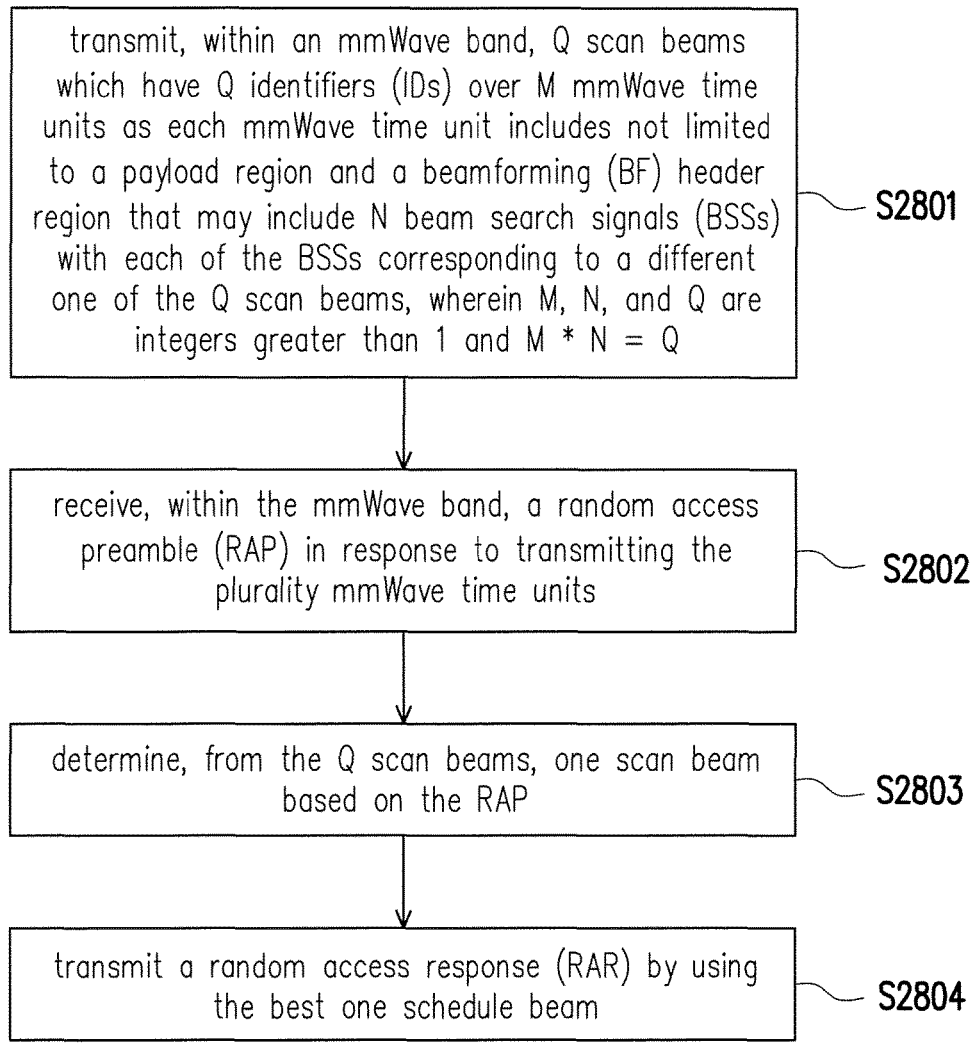
FIG. 28C illustrates a network entry method of a millimeter wave communication system from the perspective of a BS in accordance with one of the exemplary embodiments of the disclosure.

FIG. 28C illustrates a network entry method of a millimeter wave communication system from the perspective of a BS in accordance with one of the exemplary embodiments of the disclosure. In step S2801, the BS would transmit, within an mmWave band, Q scan beams which have Q identifiers (IDs) over M mmWave time units as each mmWave time unit includes not limited to a payload region and a beamforming (BF) header region that may include N beam search signals (BSSs) with each of the BSSs corresponding to a different one of the Q scan beams, wherein M, N, and Q are integers greater than 1 and M*N=Q. In step S2802, the BS would receive, within the mmWave band, a random access preamble (RAP) in response to transmitting the plurality mmWave time units. In step S2803, the BS would determine, from the Q scan beams, one scan beam based on the RAP. In step S2804, the BS would transmit a random access response (RAR) by using the best one schedule beam.

Figure 28D:
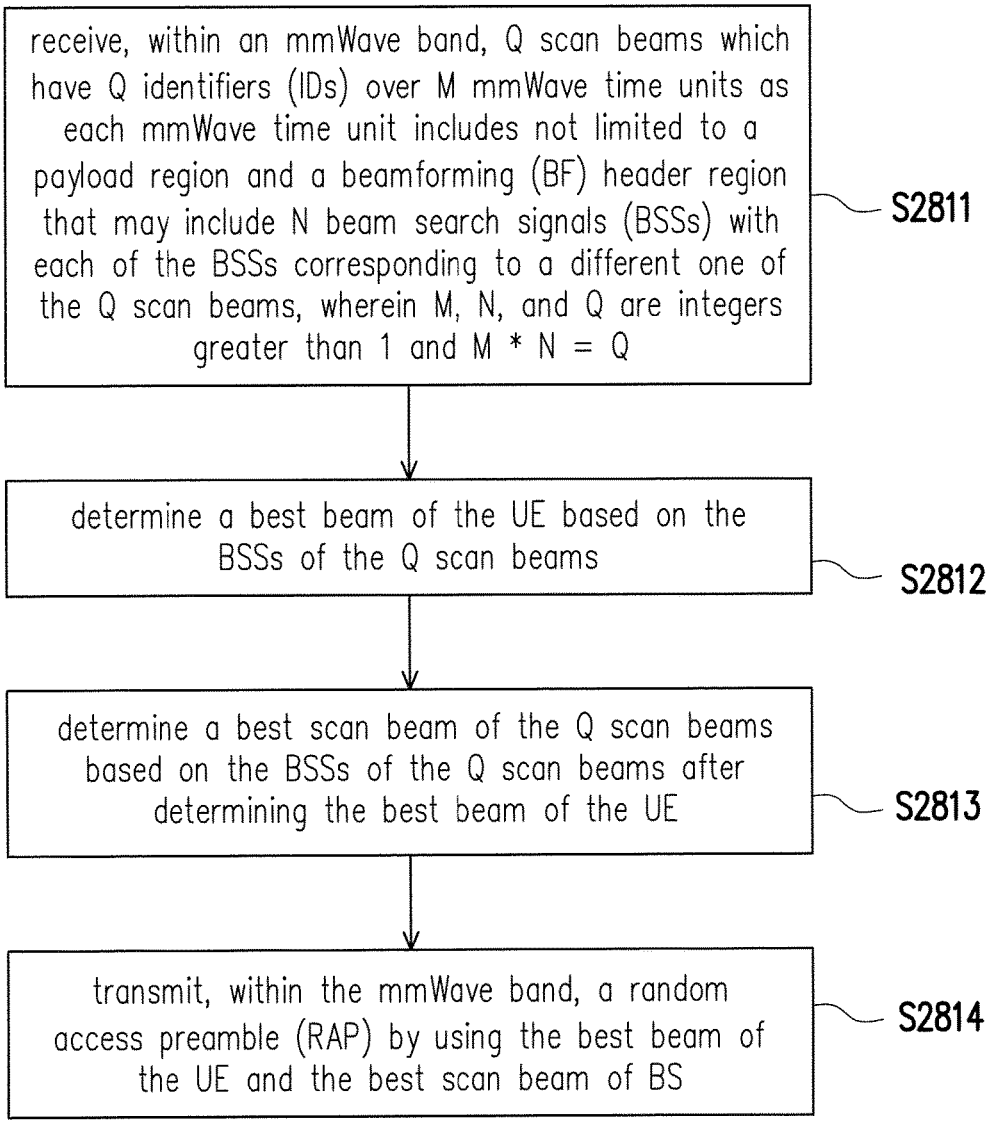
FIG. 28D illustrates a network entry method of a millimeter wave communication system from the perspective of a UE in accordance with one of the exemplary embodiments of the disclosure.

FIG. 28D illustrates a network entry method of a millimeter wave communication system from the perspective of a UE in accordance with one of the exemplary embodiments of the disclosure. In step S2811, the UE would receive, within an mmWave band, Q scan beams which have Q identifiers (IDs) over M mmWave time units as each mmWave time unit includes not limited to a payload region and a beamforming (BF) header region that may include N beam search signals (BSSs) with each of the BSSs corresponding to a different one of the Q scan beams, wherein M, N, and Q are integers greater than 1 and M*N=Q. In step S2812, the UE would determine a best beam of the UE based on the BSSs of the Q scan beams. In step S2813, the UE would determine a best scan beam of the Q scan beams based on the BSSs of the Q scan beams after determining the best beam of the UE. In step S2814, the UE would transmit, within the mmWave band, a random access preamble (RAP) by using the best beam of the UE and the best scan beam of BS.

In view of the aforementioned descriptions, the present disclosure is suitable for being used in a wireless communication system which operates in an mmWave frequency band and provides a network entry procedure so that a BS and a user equipment would be able to transmit and receive beamformed control signal and user data packets all the mmWave frequency band.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A network entry method performed by a BS of a millimeter wave (mmWave) communication system, the method comprising:

transmitting, within an mmWave band, a plurality of beam search signals (BSSs) by using Q scan beams which have Q identifiers (IDs) over M mmWave time units, wherein each of the mmWave time units comprises a payload region and a beamforming (BF) header region, the payload region is used by a plurality of base station (BS) schedule beams, the BF header region is used by the scan beams and comprises N of the BSSs with each of the BSSs corresponding to a different one of the Q scan beams, wherein M, N, and Q are integers greater than 1 and M*N=Q;

receiving, within the mmWave band, a random access preamble (RAP) in the BF region by using one of the Q scan beams in response to transmitting the plurality mmWave time units;

determining, from the Q scan beams, one scan beam based on the RAP; and transmitting a random access response (RAR) in the payload region by using one of the BS schedule beams.

2. The method of claim 1, wherein each of the BSSs implicates a different beam identifier (ID) which has a range of: 0≤beam ID≤Q−1 and is repeated every one of the M mmWave time units.

3. The method of claim 2, wherein a set of beam IDs during M mmWave time units is reused by another cell.

4. The method of claim 2, wherein the BF header region comprises a plurality of cell search signals (CSSs) transmitted in every scan beam and each of the CSSs in N transmissions has the same cell ID.

5. The method of claim 1, wherein determining, from the Q scan beams, the one scan beam based on the RAP comprising:

determining a best scan beam, which is the one scan beam from the Q scan beams based on the RAP in a random access channel (RACH) of a BF header.

6. The method of claim 1, wherein transmitting the random access response (RAR) in the payload region by using one of the BS schedule beams comprising:

determining a timing advance (TA) based on the RAP;

transmitting the random access response (RAR) with the timing advance via a physical downlink shared channel (PDSCH) of the payload region of one of the mmWave time units by using one of the BS schedule beams.

7. The method of claim 6, wherein one of the schedule beams used for transmitting the RAR is a best BS schedule beam selected from Q BS beams.

8. The method of claim 6 further comprising:

receiving a random access confirm (RAC) by using a best BS scan beam via a physical uplink shared channel (PUSCH) of the BF header region of one of the mmWave time units.

9. The method of claim 8 further comprising:

transmitting a network entry response (NER) via a physical downlink shared channel (PDSCH) of another payload region of another mmWave time unit by using a best BS schedule beam of the BS schedule beams.

10. The method of claim 1, wherein each of the mmWave time units is one of a frame, a subframe, a time slot, and an orthogonal frequency division multiplexing (OFDM) symbol.

11. A network entry method performed by a user equipment (UE) of a millimeter wave (mmWave) communication system, the method comprising:

receiving, within an mmWave band, a plurality of beam search signals (BSSs) via Q BS scan beams which have Q identifiers (IDs) over M mmWave time units, wherein each of the mmWave time units comprises a payload region and a beamforming (BF) header region, the payload region is used by a plurality of BS schedule beams, the BF header region is used by the Q BS scan beams and comprises N of the BSSs with each of the BSSs corresponding to a different one of the Q scan beams, wherein M, N, and Q are integers greater than 1 and M*N=Q;

determining a best beam of the UE based on the BSSs of the Q BS scan beams;

determining a best scan beam of the Q BS scan beams based on the BSSs of the Q BS scan beams after determining the best beam of the UE;

transmitting, within the mmWave band, a random access preamble (RAP) in the BF header region via one of the BS scan beams; and receiving, within the mmWave band, a random access response (RAR) in the payload region via one of the BS schedule beams.

12. The method of claim 11, wherein each of the BSSs received by the UE implicates a different beam identifier (ID) which has a range of: 0≤beam ID≤Q−1 and is repeated every one of the M mmWave time units.

13. The method of claim 12, wherein determining the best beam of the UE comprising:

determining the best beam of the UE based on autocorrelation of each of the BSSs.

14. The method of claim 12, wherein determining the best scan beam of the Q BS scan beams comprising:

determining the best scan beam of the Q BS scan beams based on a matched filter output of the different beam identifier (ID) of the BSSs of the Q BS scan beams and received BSSs.

15. The method of claim 11 further comprising:

determining a cell ID based on cell search signals (CSSs) within the BF header region and each of the CSSs transmitted in every BS scan beam and has the same cell ID after determining the best scan beam of the Q BS scan beams.

16. The method of claim 11, wherein transmitting, within the mmWave band, the RAP comprising:

transmitting, within the mmWave band, the RAP by using the best beam of the UE via the best scan beam of the Q BS scan beams in a random access channel (RACH) within a BF header.

17. The method of claim 11 further comprising:

receiving a random access response (RAR) from the best beam of the UE and one of the BS schedule beams of a BS via a physical downlink shared channel (PDSCH) of the payload region of one of the mmWave time units.

18. The method of claim 17 further comprising:

transmitting a random access confirm (RAC) by using the best beam of the UE via the best scan beam of the Q BS scan beams in another physical uplink shared channel (PUSCH) of another BF header region of another mmWave time unit.

19. The method of claim 18 further comprising:

receiving a network entry response (NER) via a physical downlink shared channel (PDSCH) of another payload region of another mmWave time unit from the best beam of the UE and one of the BS schedule beams.

20. The method of claim 11, wherein each of the mmWave time units is one of a frame, a subframe, a time slot, and an orthogonal frequency division multiplexing (OFDM) symbol.

21. The method of claim 11 further comprising:

performing an automatic gain control (AGC) based on an autocorrelation of the plurality of BSSs.

22. The method of claim 11 further comprising:

performing a time or frequency synchronization based on an autocorrelation and a match filtered output of the plurality of BSSs.

23. The method of claim 11, wherein the BF header region further comprises a broadcast signal (BCS), claim 11 further comprising:

detecting a system information based on the BCS.

24. The method of claim 11, wherein transmitting the RAP is by using the best beam of the UE.

25. A base station (BS) comprising:

a transmitter which operates in mmWave frequencies;

a receiver which operates in mmWave frequencies; and a processor coupled to the transmitter and the receiver and is configured at least for:

transmitting, within an mmWave band, a plurality of beam search signals (BSSs) by using Q scan beams which have Q identifiers (IDs) over M mmWave time units, wherein each of the mmWave time units comprises a payload region and a beamforming (BF) header region, the payload region is used by a plurality of base station (BS) schedule beams, the BF header region is used by the scan beams and comprises N of the BSSs with each of the BSSs corresponding to a different one of the Q scan beams, wherein M, N, and Q are integers greater than 1 and M*N=Q;

receiving, within the mmWave band, a random access preamble (RAP) in the BF region by using one of the Q scan beams in response to transmitting the plurality mmWave time units;

determining, from the Q scan beams, one scan beam based on the RAP; and transmitting a random access response (RAR) in the payload region by using one of the BS schedule beams.

26. A user equipment (UE) comprising:

a transmitter which operates in mmWave frequencies;

a receiver which operates in mmWave frequencies; and a processor coupled to the transmitter and the receiver and is configured at least for:

receiving, within an mmWave band, a plurality of beam search signals (BSSs) by using Q BS scan beams which have Q identifiers (IDs) over M mmWave time units, wherein each of the mmWave time units comprises a payload region and a beamforming (BF) header region, the payload region is used by a plurality of BS schedule beams, the BF header region is used by the Q BS scan beams and comprises N of the BSSs with each of the BSSs corresponding to a different one of the Q scan beams, wherein M, N, and Q are integers greater than 1 and M*N=Q;

determining a best beam of the UE based on the BSSs of the Q BS scan beams;

determining a best scan beam of the Q BS scan beams based on the BSSs of the Q BS scan beams after determining the best beam of the UE;

transmitting, within the mmWave band, a random access preamble (RAP) in the BF header region via one of the BS scan beams; and receiving, within the mmWave band, a random access response (RAR) in the payload region via one of the BS schedule beams.

* * * * *